US011134291B2

(12) United States Patent
Corbin et al.

(10) Patent No.: US 11,134,291 B2
(45) Date of Patent: *Sep. 28, 2021

(54) SOCIAL MEDIA QUEUE

(71) Applicant: Sonos, Inc., Santa Barbara, CA (US)

(72) Inventors: Keith Corbin, Boston, MA (US); Paul Kafadar, Santa Barbara, CA (US); Abhishek Kumar, Santa Barbara, CA (US); Ron Kuper, Arlington, MA (US); Gregory Paul Ramsperger, Somerville, MA (US); Andrej Sarkic, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,519

(22) Filed: May 15, 2017

(65) Prior Publication Data

US 2017/0251237 A1    Aug. 31, 2017

Related U.S. Application Data

(63) Continuation of application No. 14/495,595, filed on Sep. 24, 2014, now Pat. No. 9,690,540.

(51) Int. Cl.
*G06F 17/00* (2019.01)
*H04N 21/262* (2011.01)
(Continued)

(52) U.S. Cl.
CPC ....... *H04N 21/26258* (2013.01); *G05B 15/02* (2013.01); *G06F 3/165* (2013.01);
(Continued)

(58) Field of Classification Search
CPC ....... H04N 21/26258; H04N 21/25816; H04N 21/43615; H04N 21/44222; H04N 21/4788; G06F 3/165; H04L 65/403; G06Q 50/01
(Continued)

(56) References Cited

U.S. PATENT DOCUMENTS 4,296,278 A    10/1981    Cullison et al.
4,816,989 A    3/1989    Finn et al.
(Continued)

FOREIGN PATENT DOCUMENTS

CN    101410773 A    4/2009
CN    101714156 A    5/2010
(Continued)

OTHER PUBLICATIONS

International Bureau, International Preliminary Report on Patentability dated Apr. 3, 2014, issued in connection with International Application No. PCT/US2012/056467, filed on Sep. 21, 2011, 11 pages.

(Continued)

*Primary Examiner* — Paul C McCord
(74) *Attorney, Agent, or Firm* — Akerman LLP

(57) ABSTRACT

Examples provided herein are directed to social-media playback queues. In one example, a computing system may be configured to (i) receive an identifier of a media playback system, (ii) link the identifier with a social-media account, (iii) based at least on linking the identifier with the social-media account, generate a social-media playback queue that is Tillable with one or more media items playable by the media playback system, (iv) establish access permissions to the social-media playback queue, where the access permissions indicate at least one additional social media account that (a) is within a social-media network of the social-media account, and (b) has access to the social-media playback queue, (v) receive, from a computing device affiliated with the at least one additional social-media account, an indication of a media item to be added to the social-media playback queue, and (vi) add the media item to the social-media playback queue.

20 Claims, 9 Drawing Sheets

(51) Int. Cl.

| | | |
|---|---|---|
| *H04L 29/06* | (2006.01) | |
| *H04N 21/258* | (2011.01) | |
| *H04N 21/436* | (2011.01) | |
| *G06F 3/16* | (2006.01) | |
| *G05B 15/02* | (2006.01) | |
| *G06Q 50/00* | (2012.01) | |
| *H04N 21/442* | (2011.01) | |
| *H04N 21/4788* | (2011.01) | |

(52) U.S. Cl.
CPC ............ *G06Q 50/01* (2013.01); *H04L 65/403* (2013.01); *H04N 21/25816* (2013.01); *H04N 21/43615* (2013.01); *H04N 21/44218* (2013.01); *H04N 21/44222* (2013.01); *H04N 21/4788* (2013.01)

(58) Field of Classification Search
USPC .......................................................... 700/94
See application file for complete search history.

(56) References Cited

U.S. PATENT DOCUMENTS

| | | | |
|---|---|---|---|
| 5,182,552 | A | 1/1993 | Paynting |
| 5,239,458 | A | 8/1993 | Suzuki |
| 5,299,266 | A | 3/1994 | Lumsden |
| 5,406,634 | A | 4/1995 | Anderson et al. |
| 5,440,644 | A | 8/1995 | Farinelli et al. |
| 5,467,342 | A | 11/1995 | Logston et al. |
| 5,491,839 | A | 2/1996 | Schotz |
| 5,553,222 | A | 9/1996 | Milne et al. |
| 5,563,946 | A | 10/1996 | Cooper et al. |
| 5,668,884 | A | 9/1997 | Clair, Jr. et al. |
| 5,673,323 | A | 9/1997 | Schotz et al. |
| 5,751,819 | A | 5/1998 | Dorrough |
| 5,761,320 | A | 6/1998 | Farinelli et al. |
| 5,774,666 | A | 6/1998 | Portuesi |
| 5,808,662 | A | 9/1998 | Kinney et al. |
| 5,815,689 | A | 9/1998 | Shaw et al. |
| 5,856,827 | A | 1/1999 | Sudo |
| 5,867,691 | A | 2/1999 | Shiraishi |
| 5,875,354 | A | 2/1999 | Charlton et al. |
| 5,887,143 | A | 3/1999 | Saito et al. |
| 5,923,902 | A | 7/1999 | Inagaki |
| 5,946,343 | A | 8/1999 | Schotz et al. |
| 5,956,088 | A | 9/1999 | Shen et al. |
| 6,002,862 | A | 12/1999 | Takaike |
| 6,009,457 | A | 12/1999 | Moller |
| 6,026,150 | A | 2/2000 | Frank et al. |
| 6,031,818 | A | 2/2000 | Lo et al. |
| 6,032,202 | A | 2/2000 | Lea et al. |
| 6,108,686 | A | 8/2000 | Williams, Jr. |
| 6,128,318 | A | 10/2000 | Sato |
| 6,157,957 | A | 12/2000 | Berthaud |
| 6,175,872 | B1 | 1/2001 | Neumann et al. |
| 6,181,316 | B1 | 1/2001 | Little et al. |
| 6,185,737 | B1 | 2/2001 | Northcutt et al. |
| 6,195,436 | B1 | 2/2001 | Scibora et al. |
| 6,199,169 | B1 | 3/2001 | Voth |
| 6,255,961 | B1 | 7/2001 | Van Ryzin et al. |
| 6,256,554 | B1 | 7/2001 | DiLorenzo |
| 6,308,207 | B1 | 10/2001 | Tseng et al. |
| 6,324,586 | B1 | 11/2001 | Johnson |
| 6,332,147 | B1 | 12/2001 | Moran et al. |
| 6,349,339 | B1 | 2/2002 | Williams |
| 6,351,821 | B1 | 2/2002 | Voth |
| 6,404,811 | B1 | 6/2002 | Cvetko et al. |
| 6,430,353 | B1 | 8/2002 | Honda et al. |
| 6,469,633 | B1 | 10/2002 | Wachter |
| 6,487,296 | B1 | 11/2002 | Allen et al. |
| 6,522,886 | B1 | 2/2003 | Youngs et al. |
| 6,526,325 | B1 | 2/2003 | Sussman et al. |
| 6,587,127 | B1 | 7/2003 | Leeke et al. |
| 6,594,691 | B1 | 7/2003 | McCollum et al. |
| 6,598,172 | B1 | 7/2003 | Vandeusen et al. |
| 6,611,537 | B1 | 8/2003 | Edens et al. |
| 6,631,410 | B1 | 10/2003 | Kowalski et al. |
| 6,674,803 | B1 | 1/2004 | Kesselring |
| 6,728,531 | B1 | 4/2004 | Lee et al. |
| 6,732,155 | B2 | 5/2004 | Meek |
| 6,757,517 | B2 | 6/2004 | Chang |
| 6,778,869 | B2 | 8/2004 | Champion |
| 6,826,283 | B1 | 11/2004 | Wheeler et al. |
| 6,836,788 | B2 | 12/2004 | Kim et al. |
| 6,898,642 | B2 | 5/2005 | Chafle et al. |
| 6,912,610 | B2 | 6/2005 | Spencer |
| 6,920,373 | B2 | 7/2005 | Xi et al. |
| 6,934,766 | B1 | 8/2005 | Russell |
| 6,985,694 | B1 | 1/2006 | De Bonet et al. |
| 7,007,106 | B1 | 2/2006 | Flood et al. |
| 7,017,118 | B1 | 3/2006 | Carroll |
| 7,020,048 | B2 | 3/2006 | McComas |
| 7,020,791 | B1 | 3/2006 | Aweya et al. |
| 7,043,651 | B2 | 5/2006 | Aweya et al. |
| 7,047,308 | B2 | 5/2006 | Deshpande |
| 7,113,833 | B1 | 9/2006 | Brown et al. |
| 7,113,999 | B2 | 9/2006 | Pestoni et al. |
| 7,115,017 | B1 | 10/2006 | Laursen et al. |
| 7,117,451 | B2 | 10/2006 | Sielken |
| 7,124,125 | B2 | 10/2006 | Cook et al. |
| 7,130,608 | B2 | 10/2006 | Hollstrom et al. |
| 7,130,616 | B2 | 10/2006 | Janik |
| 7,143,141 | B1 | 11/2006 | Morgan et al. |
| 7,143,939 | B2 | 12/2006 | Henzerling |
| 7,162,315 | B2 | 1/2007 | Gilbert |
| 7,185,090 | B2 | 2/2007 | Kowalski et al. |
| 7,187,947 | B1 | 3/2007 | White et al. |
| 7,206,367 | B1 | 4/2007 | Moore |
| 7,209,795 | B2 | 4/2007 | Sullivan et al. |
| 7,218,708 | B2 | 5/2007 | Berezowski et al. |
| 7,236,739 | B2 | 6/2007 | Chang |
| 7,236,773 | B2 | 6/2007 | Thomas |
| 7,281,034 | B1 | 10/2007 | Eyal |
| 7,293,060 | B2 | 11/2007 | Komsi |
| 7,295,548 | B2 | 11/2007 | Blank et al. |
| 7,302,468 | B2 | 11/2007 | Wijeratne |
| 7,312,785 | B2 | 12/2007 | Tsuk et al. |
| 7,324,857 | B2 | 1/2008 | Goddard |
| 7,333,519 | B2 | 2/2008 | Sullivan et al. |
| 7,358,960 | B2 | 4/2008 | Mak |
| 7,372,846 | B2 | 5/2008 | Zwack |
| 7,391,791 | B2 | 6/2008 | Balassanian et al. |
| 7,392,102 | B2 | 6/2008 | Sullivan et al. |
| 7,483,538 | B2 | 1/2009 | McCarty et al. |
| 7,483,958 | B1 | 1/2009 | Elabbady et al. |
| 7,496,623 | B2 | 2/2009 | Szeto et al. |
| 7,496,633 | B2 | 2/2009 | Szeto et al. |
| 7,571,014 | B1 | 8/2009 | Lambourne et al. |
| 7,574,274 | B2 | 8/2009 | Holmes |
| 7,599,685 | B2 | 10/2009 | Goldberg et al. |
| 7,630,501 | B2 | 12/2009 | Blank et al. |
| 7,643,894 | B2 | 1/2010 | Braithwaite et al. |
| 7,657,224 | B2 | 2/2010 | Goldberg et al. |
| 7,657,644 | B1 | 2/2010 | Zheng |
| 7,657,910 | B1 | 2/2010 | McAulay et al. |
| 7,668,990 | B2 | 2/2010 | Krzyzanowski et al. |
| 7,669,219 | B2 | 2/2010 | Scott, III |
| 7,675,943 | B2 | 3/2010 | Mosig et al. |
| 7,676,142 | B1 | 3/2010 | Hung |
| 7,702,279 | B2 | 4/2010 | Ko et al. |
| 7,720,096 | B2 | 5/2010 | Klemets |
| 7,725,533 | B2 | 5/2010 | Szeto et al. |
| 7,725,551 | B2 | 5/2010 | Szeto et al. |
| 7,739,271 | B2 | 6/2010 | Cook et al. |
| 7,742,740 | B2 | 6/2010 | Goldberg et al. |
| 7,788,138 | B2 | 8/2010 | Viehmann et al. |
| 7,805,682 | B1 | 9/2010 | Lambourne |
| 7,835,689 | B2 | 11/2010 | Goldberg et al. |
| 7,853,341 | B2 | 12/2010 | McCarty et al. |
| 7,865,137 | B2 | 1/2011 | Goldberg et al. |
| 7,885,622 | B2 | 2/2011 | Krampf et al. |
| 7,916,877 | B2 | 3/2011 | Goldberg et al. |
| 7,917,082 | B2 | 3/2011 | Goldberg et al. |
| 7,921,369 | B2 | 4/2011 | Bill |

(56) References Cited

U.S. PATENT DOCUMENTS

| | | |
|---|---|---|
| 7,934,239 B1 | 4/2011 | Dagman |
| 7,970,922 B2 * | 6/2011 | Svendsen .............. G06Q 30/02 |
| | | 709/204 |
| 7,987,294 B2 | 7/2011 | Bryce et al. |
| 7,996,566 B1 | 8/2011 | Sylvain et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,086,752 B2 | 12/2011 | Millington et al. |
| 8,103,009 B2 | 1/2012 | McCarty et al. |
| 8,112,032 B2 | 2/2012 | Ko et al. |
| 8,131,390 B2 | 3/2012 | Braithwaite et al. |
| 8,169,938 B2 | 5/2012 | Duchscher et al. |
| 8,200,602 B2 | 6/2012 | Farrelly |
| 8,214,873 B2 | 7/2012 | Weel |
| 8,230,099 B2 | 7/2012 | Weel |
| 8,234,395 B2 | 7/2012 | Millington et al. |
| 8,271,115 B2 | 9/2012 | Yoshida |
| 8,290,603 B1 | 10/2012 | Lambourne |
| 8,315,555 B2 | 11/2012 | Ko et al. |
| 8,370,678 B2 | 2/2013 | Millington et al. |
| 8,392,505 B2 * | 3/2013 | Haughay, Jr. ..... G06F 17/30749 |
| | | 709/205 |
| 8,423,659 B2 | 4/2013 | Millington |
| 8,483,853 B1 | 7/2013 | Lambourne |
| 8,521,316 B2 | 8/2013 | Louboutin |
| 8,588,949 B2 | 11/2013 | Lambourne et al. |
| 8,613,385 B1 | 12/2013 | Hulet et al. |
| 8,666,826 B2 | 3/2014 | Narayanan et al. |
| 8,775,546 B2 | 7/2014 | Millington |
| 8,826,135 B1 * | 9/2014 | Durham ............... G06F 3/0484 |
| | | 715/716 |
| 8,843,500 B2 | 9/2014 | Nogues et al. |
| 8,892,648 B1 | 11/2014 | Durham et al. |
| 8,910,265 B2 | 12/2014 | Lang et al. |
| 8,942,252 B2 | 1/2015 | Balassanian et al. |
| 8,990,701 B2 | 3/2015 | Olofsson |
| 9,052,810 B2 | 6/2015 | Reimann et al. |
| 9,137,564 B2 | 9/2015 | Reimann |
| 9,165,255 B1 | 10/2015 | Shetty et al. |
| 9,229,938 B1 | 1/2016 | Jaini et al. |
| 9,246,866 B1 | 1/2016 | Sanders |
| 9,247,363 B2 | 1/2016 | Triplett et al. |
| 9,286,384 B2 * | 3/2016 | Kuper ............... G06F 17/30761 |
| 9,344,292 B2 | 5/2016 | Griffiths et al. |
| 9,374,607 B2 | 6/2016 | Bates et al. |
| 9,478,247 B2 | 10/2016 | Chen et al. |
| 9,489,383 B2 | 11/2016 | Hyman et al. |
| 9,510,055 B2 | 11/2016 | Kuper et al. |
| 9,524,338 B2 | 12/2016 | Van et al. |
| 9,696,874 B2 | 7/2017 | Kulick et al. |
| 9,715,500 B2 | 7/2017 | Cue et al. |
| 9,756,092 B2 | 9/2017 | Zhang et al. |
| 9,942,335 B2 | 4/2018 | Schneider et al. |
| 10,032,233 B2 | 7/2018 | Papakipos et al. |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0054134 A1 | 5/2002 | Kelts |
| 2002/0056117 A1 | 5/2002 | Hasegawa et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0116476 A1 | 8/2002 | Eyal et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0178191 A1 | 11/2002 | Sielken |
| 2002/0188762 A1 | 12/2002 | Tomassetti et al. |
| 2003/0002609 A1 | 1/2003 | Faller et al. |
| 2003/0020763 A1 | 1/2003 | Mayer et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0088875 A1 | 5/2003 | Gay et al. |
| 2003/0099212 A1 | 5/2003 | Anjum et al. |
| 2003/0099221 A1 | 5/2003 | Rhee |
| 2003/0105820 A1 | 6/2003 | Haims et al. |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | McCarty et al. |
| 2003/0220973 A1 | 11/2003 | Zhu et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0025185 A1 | 2/2004 | Goci et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0131192 A1 | 7/2004 | Metcalf |
| 2004/0170383 A1 | 9/2004 | Mazur |
| 2004/0203378 A1 | 10/2004 | Powers |
| 2004/0215611 A1 | 10/2004 | Jawa et al. |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2004/0261040 A1 | 12/2004 | Radcliffe et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0058149 A1 | 3/2005 | Howe |
| 2005/0081213 A1 | 4/2005 | Suzuoki et al. |
| 2005/0108320 A1 | 5/2005 | Lord et al. |
| 2005/0114538 A1 | 5/2005 | Rose |
| 2005/0125357 A1 | 6/2005 | Saadat et al. |
| 2005/0155072 A1 | 7/2005 | Kaczowka et al. |
| 2005/0166157 A1 | 7/2005 | Ollis et al. |
| 2005/0166258 A1 | 7/2005 | Vasilevsky et al. |
| 2005/0177643 A1 | 8/2005 | Xu |
| 2005/0181348 A1 | 8/2005 | Carey et al. |
| 2005/0195205 A1 | 9/2005 | Abrams, Jr. |
| 2005/0201254 A1 | 9/2005 | Looney et al. |
| 2005/0234875 A1 | 10/2005 | Auerbach et al. |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0095516 A1 | 5/2006 | Wijeratne |
| 2006/0107237 A1 | 5/2006 | Kim |

(56) References Cited

U.S. PATENT DOCUMENTS

| | | |
|---|---|---|
| 2006/0119497 A1 | 6/2006 | Miller et al. |
| 2006/0143236 A1 | 6/2006 | Wu |
| 2006/0168340 A1 | 7/2006 | Heller et al. |
| 2006/0195462 A1 | 8/2006 | Rogers |
| 2006/0195479 A1 | 8/2006 | Spiegelman et al. |
| 2006/0195480 A1 | 8/2006 | Spiegelman et al. |
| 2006/0253436 A1 | 11/2006 | Cook et al. |
| 2006/0253782 A1 | 11/2006 | Stark et al. |
| 2006/0294074 A1 | 12/2006 | Chang |
| 2007/0033402 A1 | 2/2007 | Williams et al. |
| 2007/0038999 A1 | 2/2007 | Millington et al. |
| 2007/0043847 A1 | 2/2007 | Carter et al. |
| 2007/0048713 A1 | 3/2007 | Plastina et al. |
| 2007/0049256 A1 | 3/2007 | Wassingbo |
| 2007/0054680 A1 | 3/2007 | Mo et al. |
| 2007/0088747 A1 | 4/2007 | Cheng et al. |
| 2007/0136778 A1 | 6/2007 | Birger et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0169115 A1 | 7/2007 | Ko et al. |
| 2007/0180137 A1 | 8/2007 | Rajapakse |
| 2007/0214182 A1 | 9/2007 | Rosenberg |
| 2007/0224937 A1 | 9/2007 | Jung et al. |
| 2007/0271232 A1 | 11/2007 | Mattox et al. |
| 2007/0271388 A1 | 11/2007 | Bowra et al. |
| 2007/0288470 A1 | 12/2007 | Kauniskangas et al. |
| 2007/0294131 A1 | 12/2007 | Roman et al. |
| 2007/0299778 A1 | 12/2007 | Haveson et al. |
| 2008/0005690 A1 | 1/2008 | Van Vugt |
| 2008/0016465 A1 | 1/2008 | Foxenland |
| 2008/0022320 A1 | 1/2008 | Ver Steeg |
| 2008/0052371 A1 | 2/2008 | Partovi et al. |
| 2008/0059510 A1 | 3/2008 | Cardamore et al. |
| 2008/0077261 A1 | 3/2008 | Baudino et al. |
| 2008/0086368 A1 | 4/2008 | Bauman et al. |
| 2008/0091771 A1 | 4/2008 | Allen et al. |
| 2008/0109529 A1 | 5/2008 | Story |
| 2008/0120429 A1 | 5/2008 | Millington et al. |
| 2008/0144861 A1 | 6/2008 | Melanson et al. |
| 2008/0152165 A1 | 6/2008 | Zacchi |
| 2008/0154959 A1 | 6/2008 | Dunko |
| 2008/0194276 A1 | 8/2008 | Lin et al. |
| 2008/0301280 A1 | 12/2008 | Chasen et al. |
| 2008/0319833 A1 | 12/2008 | Svendsen |
| 2009/0005893 A1 | 1/2009 | Sugii et al. |
| 2009/0031336 A1 | 1/2009 | Chavez et al. |
| 2009/0041423 A1 | 2/2009 | Weber et al. |
| 2009/0063414 A1 | 3/2009 | White et al. |
| 2009/0076881 A1 | 3/2009 | Svendsen |
| 2009/0076917 A1 | 3/2009 | Jablokov et al. |
| 2009/0083117 A1 | 3/2009 | Svendsen et al. |
| 2009/0133069 A1 | 5/2009 | Conness et al. |
| 2009/0150806 A1 | 6/2009 | Evje et al. |
| 2009/0157905 A1 | 6/2009 | Davis |
| 2009/0175429 A1 | 7/2009 | Cohen et al. |
| 2009/0179867 A1 | 7/2009 | Shim et al. |
| 2009/0216855 A1 | 8/2009 | Lang et al. |
| 2009/0222115 A1 | 9/2009 | Malcolm et al. |
| 2009/0228919 A1 | 9/2009 | Zott et al. |
| 2009/0249222 A1 | 10/2009 | Schmidt et al. |
| 2009/0265426 A1 | 10/2009 | Svendsen et al. |
| 2009/0307062 A1 | 12/2009 | Lutnick et al. |
| 2009/0313369 A1 | 12/2009 | Wormington et al. |
| 2010/0010648 A1 | 1/2010 | Bull et al. |
| 2010/0017366 A1 | 1/2010 | Robertson et al. |
| 2010/0017714 A1* | 1/2010 | Agarwal ............ G06Q 10/00 715/716 |
| 2010/0023578 A1* | 1/2010 | Brant ............ G06F 17/30749 709/203 |
| 2010/0031366 A1 | 2/2010 | Knight et al. |
| 2010/0036950 A1 | 2/2010 | Bae et al. |
| 2010/0049835 A1 | 2/2010 | Ko et al. |
| 2010/0054275 A1 | 3/2010 | Noonan et al. |
| 2010/0082731 A1 | 4/2010 | Haughay et al. |
| 2010/0094834 A1 | 4/2010 | Svendsen |
| 2010/0095332 A1* | 4/2010 | Gran ............ G06F 17/30038 725/93 |
| 2010/0131567 A1 | 5/2010 | Dorogusker et al. |
| 2010/0162324 A1* | 6/2010 | Mehta ............ H04N 7/17318 725/61 |
| 2010/0205222 A1 | 8/2010 | Gajdos et al. |
| 2010/0228740 A1 | 9/2010 | Cannistraro et al. |
| 2010/0235520 A1 | 9/2010 | Attanasio et al. |
| 2010/0262909 A1 | 10/2010 | Hsieh |
| 2010/0284389 A1 | 11/2010 | Ramsay et al. |
| 2010/0299391 A1 | 11/2010 | Demarta et al. |
| 2010/0299639 A1 | 11/2010 | Ramsay et al. |
| 2010/0318917 A1 | 12/2010 | Holladay et al. |
| 2010/0325218 A1 | 12/2010 | Castro et al. |
| 2010/0332326 A1 | 12/2010 | Ishai |
| 2011/0004330 A1 | 1/2011 | Rothkopf et al. |
| 2011/0041080 A1 | 2/2011 | Fleischman et al. |
| 2011/0066941 A1* | 3/2011 | Chipchase ............ G06F 3/167 715/716 |
| 2011/0066943 A1 | 3/2011 | Brillon et al. |
| 2011/0087842 A1 | 4/2011 | Lu et al. |
| 2011/0119706 A1 | 5/2011 | Scott et al. |
| 2011/0154173 A1 | 6/2011 | Herlein |
| 2011/0196888 A1 | 8/2011 | Hanson et al. |
| 2011/0202430 A1 | 8/2011 | Narayanan et al. |
| 2011/0202842 A1 | 8/2011 | Weatherly et al. |
| 2011/0211534 A1 | 9/2011 | Schmidt et al. |
| 2011/0225417 A1 | 9/2011 | Maharajh et al. |
| 2011/0238755 A1 | 9/2011 | Khan et al. |
| 2011/0246383 A1 | 10/2011 | Gibson et al. |
| 2011/0264732 A1 | 10/2011 | Robbin et al. |
| 2011/0314388 A1 | 12/2011 | Wheatley |
| 2012/0029671 A1 | 2/2012 | Millington et al. |
| 2012/0030366 A1 | 2/2012 | Collart et al. |
| 2012/0054278 A1 | 3/2012 | Taleb et al. |
| 2012/0059495 A1 | 3/2012 | Weiss et al. |
| 2012/0060046 A1 | 3/2012 | Millington |
| 2012/0071996 A1 | 3/2012 | Svendsen |
| 2012/0096526 A1 | 4/2012 | Brahmanapalli et al. |
| 2012/0117168 A1 | 5/2012 | Sugiyama et al. |
| 2012/0117185 A1 | 5/2012 | Cassidy |
| 2012/0117586 A1 | 5/2012 | McCoy et al. |
| 2012/0124176 A1 | 5/2012 | Curtis et al. |
| 2012/0129446 A1 | 5/2012 | Ko et al. |
| 2012/0151320 A1 | 6/2012 | McClements, IV |
| 2012/0158531 A1 | 6/2012 | Dion et al. |
| 2012/0159393 A1 | 6/2012 | Sethi et al. |
| 2012/0206623 A1 | 8/2012 | Nakama |
| 2012/0210205 A1 | 8/2012 | Sherwood et al. |
| 2012/0221951 A1 | 8/2012 | Kidron |
| 2012/0223639 A1 | 9/2012 | Baeumges et al. |
| 2012/0233067 A1 | 9/2012 | Matthew et al. |
| 2012/0233639 A1 | 9/2012 | Zott et al. |
| 2012/0272156 A1 | 10/2012 | Kerger et al. |
| 2012/0284423 A1 | 11/2012 | Weel |
| 2012/0311635 A1 | 12/2012 | Mushkatblat |
| 2012/0315884 A1 | 12/2012 | Forutanpour et al. |
| 2012/0331386 A1 | 12/2012 | Hicken et al. |
| 2013/0007617 A1 | 1/2013 | Mackenzie et al. |
| 2013/0024880 A1 | 1/2013 | Moloney-Egnatios et al. |
| 2013/0031162 A1 | 1/2013 | Willis et al. |
| 2013/0061296 A1 | 3/2013 | Reddy et al. |
| 2013/0070093 A1 | 3/2013 | Rivera et al. |
| 2013/0073584 A1 | 3/2013 | Kuper et al. |
| 2013/0073979 A1 | 3/2013 | Shepherd et al. |
| 2013/0080599 A1 | 3/2013 | Ko et al. |
| 2013/0080955 A1 | 3/2013 | Reimann et al. |
| 2013/0081110 A1 | 3/2013 | McGowan |
| 2013/0094670 A1 | 4/2013 | Millington |
| 2013/0128038 A1 | 5/2013 | Cok et al. |
| 2013/0129232 A1 | 5/2013 | Cok et al. |
| 2013/0130729 A1 | 5/2013 | Cok et al. |
| 2013/0159858 A1 | 6/2013 | Joffray et al. |
| 2013/0166649 A1* | 6/2013 | Atzmon ............ H04L 67/22 709/204 |
| 2013/0173034 A1 | 7/2013 | Reimann et al. |
| 2013/0173531 A1 | 7/2013 | Rinearson et al. |
| 2013/0173794 A1 | 7/2013 | Agerbak et al. |

(56) References Cited

U.S. PATENT DOCUMENTS

| | | |
|---|---|---|
| 2013/0174204 A1 | 7/2013 | Coburn, IV et al. |
| 2013/0191454 A1 | 7/2013 | Oliver et al. |
| 2013/0191749 A1 | 7/2013 | Coburn, IV et al. |
| 2013/0198633 A1 | 8/2013 | Hyman |
| 2013/0221951 A1 | 8/2013 | Anderson et al. |
| 2013/0246522 A1 | 9/2013 | Bilinski et al. |
| 2013/0246916 A1 | 9/2013 | Reimann et al. |
| 2013/0254207 A1 | 9/2013 | Coburn, IV et al. |
| 2013/0254663 A1 | 9/2013 | Bates et al. |
| 2013/0297686 A1* | 11/2013 | Bilinski .......... H04L 65/60 709/204 |
| 2013/0310316 A1 | 11/2013 | Hellstrom et al. |
| 2013/0339397 A1 | 12/2013 | Herasymchuk |
| 2013/0339589 A1 | 12/2013 | Qawami et al. |
| 2013/0343567 A1 | 12/2013 | Triplett et al. |
| 2013/0346859 A1 | 12/2013 | Bates et al. |
| 2014/0025688 A1 | 1/2014 | Andler et al. |
| 2014/0047074 A1 | 2/2014 | Chung et al. |
| 2014/0052770 A1 | 2/2014 | Gran et al. |
| 2014/0059431 A1* | 2/2014 | Svendsen .......... G06F 17/30749 715/716 |
| 2014/0067998 A1* | 3/2014 | Garcia ............ H04N 21/4884 709/217 |
| 2014/0075308 A1 | 3/2014 | Sanders et al. |
| 2014/0075316 A1 | 3/2014 | Li |
| 2014/0081796 A1 | 3/2014 | Cohen |
| 2014/0093219 A1 | 4/2014 | Trivedi |
| 2014/0108528 A1 | 4/2014 | Papakipos et al. |
| 2014/0115061 A1 | 4/2014 | Reddy et al. |
| 2014/0122590 A1 | 5/2014 | Svendsen |
| 2014/0181655 A1 | 6/2014 | Kumar et al. |
| 2014/0201197 A1 | 7/2014 | Kumar et al. |
| 2014/0201632 A1* | 7/2014 | Kunigita ............ H04N 21/4667 715/716 |
| 2014/0201635 A1 | 7/2014 | Kumar et al. |
| 2014/0204076 A1 | 7/2014 | Kuper et al. |
| 2014/0208205 A1 | 7/2014 | Bartholomew |
| 2014/0223099 A1 | 8/2014 | Kidron |
| 2014/0237361 A1 | 8/2014 | Martin et al. |
| 2014/0244863 A1 | 8/2014 | Bradley et al. |
| 2014/0310058 A1 | 10/2014 | Aral et al. |
| 2014/0310779 A1 | 10/2014 | Lof et al. |
| 2014/0330951 A1 | 11/2014 | Sukoff et al. |
| 2014/0337959 A1 | 11/2014 | Garmark et al. |
| 2014/0341528 A1 | 11/2014 | Mahate et al. |
| 2014/0359680 A1 | 12/2014 | Shivadas et al. |
| 2015/0039620 A1 | 2/2015 | Ning |
| 2015/0046458 A1 | 2/2015 | Hu |
| 2015/0066892 A1 | 3/2015 | Astore |
| 2015/0067054 A1 | 3/2015 | Yoo et al. |
| 2015/0067871 A1 | 3/2015 | Commons et al. |
| 2015/0074534 A1 | 3/2015 | Didomenico et al. |
| 2015/0095170 A1 | 4/2015 | Lang et al. |
| 2015/0095680 A1 | 4/2015 | Gossain et al. |
| 2015/0113058 A1 | 4/2015 | Zhang et al. |
| 2015/0121220 A1* | 4/2015 | Lee ............... H04W 4/21 715/716 |
| 2015/0128162 A1 | 5/2015 | Ionescu et al. |
| 2015/0161360 A1* | 6/2015 | Paruchuri ........... G06F 21/10 726/27 |
| 2015/0185599 A1 | 7/2015 | Mullins |
| 2015/0186110 A1 | 7/2015 | Kannan |
| 2015/0220498 A1 | 8/2015 | Munoz et al. |
| 2015/0220558 A1* | 8/2015 | Snibbe ............. H04N 21/854 707/627 |
| 2015/0286360 A1 | 10/2015 | Wachter et al. |
| 2015/0310009 A1 | 10/2015 | Van Der Heide |
| 2015/0312299 A1 | 10/2015 | Chen |
| 2015/0331940 A1 | 11/2015 | Manning |
| 2016/0036881 A1* | 2/2016 | Tembey ............. H04N 21/2223 709/219 |
| 2016/0063011 A1 | 3/2016 | Wehbi et al. |
| 2016/0082348 A1 | 3/2016 | Kehoe et al. |
| 2016/0147501 A1 | 5/2016 | Gilbert |
| 2016/0180248 A1 | 6/2016 | Regan |
| 2016/0253145 A1 | 9/2016 | Lee et al. |
| 2017/0161119 A1 | 6/2017 | Boyle et al. |
| 2017/0169522 A1 | 6/2017 | Hyman et al. |
| 2017/0236512 A1 | 8/2017 | Williams et al. |

FOREIGN PATENT DOCUMENTS

| | | |
|---|---|---|
| CN | 102947827 A | 2/2013 |
| CN | 104126309 A | 10/2014 |
| EP | 0251584 A2 | 1/1988 |
| EP | 0672985 A1 | 9/1995 |
| EP | 1111527 A2 | 6/2001 |
| EP | 1389853 A1 | 2/2004 |
| JP | 2004354721 A | 12/2004 |
| JP | 2007520808 A | 7/2007 |
| JP | 2009540638 A | 11/2009 |
| JP | 2010141748 A | 6/2010 |
| JP | 2011128957 | 6/2011 |
| JP | 2011223124 A | 11/2011 |
| KR | 20010090215 | 10/2001 |
| KR | 20050051785 | 6/2005 |
| KR | 1020070040592 | 4/2007 |
| KR | 20070048922 | 5/2007 |
| KR | 100890993 | 3/2009 |
| KR | 20100060498 A | 6/2010 |
| KR | 20100071724 | 6/2010 |
| KR | 20100134164 | 12/2010 |
| KR | 20110064635 | 6/2011 |
| KR | 20130083012 A | 7/2013 |
| WO | 199525313 | 9/1995 |
| WO | 199961985 | 12/1999 |
| WO | 200147248 | 6/2001 |
| WO | 200153994 | 7/2001 |
| WO | 02052540 A1 | 7/2002 |
| WO | 2002052540 | 7/2002 |
| WO | 2003093950 A2 | 11/2003 |
| WO | 2005013047 A2 | 2/2005 |
| WO | 2005079071 A1 | 8/2005 |
| WO | 2007023120 A1 | 3/2007 |
| WO | 2010018429 A1 | 2/2010 |
| WO | 2011100264 A3 | 11/2011 |
| WO | 2011157891 A1 | 12/2011 |
| WO | 2012056326 A2 | 5/2012 |
| WO | 2012106269 | 8/2012 |
| WO | 2013139239 A1 | 9/2013 |
| WO | 2014004181 | 1/2014 |
| WO | 2014116693 A1 | 7/2014 |
| WO | 2014145746 | 9/2014 |

OTHER PUBLICATIONS

International Bureau, International Preliminary Report on Patentability, dated Aug. 6, 2015, issued in connection with International Application No. PCT/US2014/012534, filed on Jan. 22, 2014, 6 pages.

International Bureau, International Preliminary Report on Patentability dated Dec. 15, 2016, issued in connection with International Application No. PCT/US2015/031934, filed on May 21, 2015, 11 pages.

International Bureau, International Preliminary Report on Patentability dated Aug. 18, 2016, issued in connection with International Application No. PCT/US2015/014156, filed on Feb. 3, 2015, 10 pages.

International Bureau,International Preliminary Report on Patentability dated Sep. 15, 2016, issued in connection with International Application No. PCT/US2015/018850, filed on Mar. 5, 2015, 10 pages.

International Searching Authority, International Preliminary Report on Patentability dated Apr. 6, 2017, issued in connection with International Application No. PCT/US2015/051968 filed on Sep. 24, 2015, 10 pages.

International Searching Authority, International Preliminary Report on Patentability dated Apr. 6, 2017, issued in connection with International Application No. PCT/US2015/051975 filed on Sep. 24, 2015, 9 pages.

(56) References Cited

OTHER PUBLICATIONS

International Searching Authority, International Preliminary Report on Patentability dated Apr. 6, 2017, issued in connection with International Application No. PCT/US2015/051983 filed on Sep. 24, 2015, 7 pages.
International Searching Authority, International Preliminary Report on Patentability dated Apr. 6, 2017, issued in connection with International Application No. PCT/US2015/051989 filed on Sep. 24, 2015, 7 pages.
International Searching Authority, International Preliminary Report on Patentability dated Apr. 6, 2017, issued in connection with International Application No. PCT/US2015/051993 filed on Sep. 24, 2015, 8 pages.
International Searching Authority, International Preliminary Report on Patentability dated Feb. 23, 2017, issued in connection with International Application No. PCT/US2015/044218, filed on Aug. 7, 2015, 10 pages.
International Searching Authority, International Search Report and Written Opinion dated Nov. 6, 2015, issued in connection with International Application No. PCT/US2015/051993, filed on Sep. 24, 2015, 10 pages.
International Searching Authority, International Search Report and Written Opinion dated Dec. 7, 2015, issued in connection with International Application No. PCT/US2015/051968, filed on Sep. 24, 2015, 14 pages.
International Searching Authority, International Search Report and Written Opinion dated Dec. 16, 2015, issued in connection with International Application No. PCT/US2015/051989 filed on Sep. 24, 2015, 11 pages.
International Searching Authority, International Search Report and Written Opinion dated Dec. 21, 2015, issued in connection with International Application No. PCT/US2015/051983 filed on Sep. 24, 2015, 11 pages.
International Searching Authority, International Search Report and Written Opinion dated Nov. 23, 2015, issued in connection with International Application No. PCT/US2015/051975, filed on Sep. 24, 2015, 14 pages.
International Searching Authority, International Search Report and Written Opinion dated Apr. 24, 2015, issued in connection with International Application No. PCT/US2015/014156, filed on Feb. 3, 2015, 13 pages.
International Searching Authority, International Search Report and Written Opinion dated Aug. 27, 2015, issued in connection with International Application No. PCT/US2015/031934, filed on May 21, 2015, 14 pages.
International Searching Authority, International Search Report and Written Opinion dated Nov. 27, 2015, issued in connection with International Application No. PCT/US2015/044218, filed on Aug. 7, 2015, 13 pages.
International Searching Authority, International Search Report and Written Opinion dated May 29, 2015, issued in connection with International Application No. PCT/US2015/018850, filed on Mar. 5, 2015, 13 pages.
International Searching Authority, International Search Report dated May 8, 2014, issued in connection with International Application No. PCT/US2014/012534, filed on Jan. 24, 2014, 3 pages.
International Searching Authority, International Search Report dated Dec. 27, 2012, issued in aonnection with International Application No. PCT/US2012/047620, filed on Jul. 20, 2011, 3 pages.
International Searching Authority, Written Opinion dated Dec. 27, 2012, issued in connection with International Application No. PCT/US2012/047620, filed on Jul. 20, 2011, 5 pages.
International Searhing Authority, International Search Report and Written Opinion dated Feb. 28, 2013, issued in connection with International Application No. PCT/US2012/056467, filed on Sep. 21, 2012, 12 pages.
Ishibashi et al., "A Group Synchronization Mechanism for Live Media in Multicast Communications," IEEE Global Telecommunications Conference, 1997, pp. 746-752, vol. 2.
Ishibashi et al., "A Group Synchronization Mechanism for Stored Media in Multicast Communications," IEEE Information Revolution and Communications, 1997, pp. 692-700, vol. 2.
Japanese Patent Office, Notice of Rejection dated Nov. 8, 2016, issued in connection with Japanese Application No. 2015-555237, 6 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Mills, David L., "Precision Synchronization of Computer Network Clocks," ACM SIGCOMM Computer Communication Review, 1994, pp. 28-43, vol. 24, No. 2.
Motorola, "Simplefi, Wireless Digital Audio Receiver, Installation and User Guide," Dec. 31, 2001, 111 pages.
Nilsson, M., "ID3 Tag Version 2," Mar. 26, 1998, 28 pages.
Non-Final Office Action dated Nov. 1, 2016, issued in connection with U.S. Appl. No. 14/173,253, filed Feb. 5, 2014, 21 pages.
Non-Final Office Action dated Oct. 1, 2015, issued in connection with U.S. Appl. No. 13/748,357, filed Jan. 23, 2013, 18 pages.
Non-Final Office Action dated Oct. 3, 2017, issued in connection with U.S. Appl. No. 14/495,633, filed Sep. 24, 2014, 18 pages.
Non-Final Office Action dated Apr. 6, 2016, issued in connection with U.S. Appl. No. 14/297,193, filed Jun. 5, 2014, 26 pages.
Non-Final Office Action dated May 6, 2015, issued in connection with U.S. Appl. No. 13/748,357, filed Jan. 23, 2013, 17 pages.
Non-Final Office Action dated Jul. 10, 2017, issued in connection with U.S. Appl. No. 14/297,193, filed Jun. 5, 2014, 33 pages.
Non-Final Office Action dated Sep. 10, 2015, issued in connection with U.S. Appl. No. 14/197,403, filed Mar. 5, 2014, 16 pages.
Non-Final Office Action dated Jan. 12, 2017, issued in connection with U.S. Appl. No. 14/275,112, filed May 12, 2014, 25 pages.
Non-Final Office Action dated Jun. 14, 2017, issued in connection with U.S. Appl. No. 14/495,659, filed Sep. 24, 2014, 15 pages.
Non-Final Office Action dated Dec. 17, 2015, issued in connection with U.S. Appl. No. 14/173,253, filed Feb. 5, 2014, 18 pages.
Non-Final Office Action dated Jun. 17, 2016, issued in connection with U.S. Appl. No. 14/495,706, filed Sep. 24, 2014, 19 pages.
Non-Final Office Action dated May 18, 2016, issued in connection with U.S. Appl. No. 14/197,403, filed Mar. 5, 2014, 21 pages.
North American MPEG-2 Information, "The MPEG-2 Transport Stream," Retrieved from the Internet: URL: http://www.coolstf.com/mpeg#ts, 2006, pp. 1-5.
Notice of Allowance dated May 4, 2016, issued in connection with U.S. Appl. No. 13/748,357, filed Jan. 23, 2013, 11 pages.
Notice of Allowance dated Apr. 6, 2017, issued in connection with U.S. Appl. No. 14/197,403, filed Mar. 5, 2014, 5 pages.
Notice of Allowance dated Jan. 12, 2017, issued in connection with U.S. Appl. No. 14/495,595, filed Sep. 24, 2014, 5 pages.
Notice of Allowance dated Sep. 19, 2017, issued in connection with U.S. Appl. No. 14/455,651, filed Aug. 8, 2014, 12 pages.
Notice of Allowance dated Aug. 24, 2017, issued in connection with U.S. Appl. No. 14/495,590, filed Sep. 24, 2014, 10 pages.
Notice of Allowance dated Jan. 26, 2017, issued in connection with U.S. Appl. No. 14/495,706, filed Sep. 24, 2014, 8 pages.
Notice of Allowance dated Dec. 29, 2016, issued in connection with U.S. Appl. No. 14/197,403, filed Mar. 5, 2014, 5 pages.
Notice of Allowance dated May 31, 2017, issued in connection with U.S. Appl. No. 14/495,684, filed Sep. 24, 2014, 5 pages.
Notice of Allowance dated May 4, 2017, issued in connection with U.S. Appl. No. 14/495,595, filed Sep. 24, 2014, 5 pages.
Palm, Inc., "Handbook for the Palm VII Handheld," May 2000, 311 pages.

(56) References Cited

OTHER PUBLICATIONS

Park et al., "Group Synchronization in MultiCast Media Communications," Proceedings of the 5th Research on Multicast Technology Workshop, 2003, 5 pages.
Polycom Conference Composer User Guide, copyright 2001, 29 pages.
Preinterview First Office Action dated May 4, 2016, issued in connection with U.S. Appl. No. 14/455,651, filed Aug. 8, 2014, 7 pages.
Preinterview First Office Action dated May 4, 2016, issued in connection with U.S. Appl. No. 14/495,659, filed Sep. 24, 2014, 6 pages.
Preinterview First Office Action dated May 5, 2016, issued in connection with U.S. Appl. No. 14/495,595, filed Sep. 24, 2014, 6 pages.
Preinterview First Office Action dated May 16, 2016, issued in connection with U.S. Appl. No. 14/495,633, filed Sep. 24, 2014, 6 pages.
Preinterview First Office Action dated Oct. 19, 2016, issued in connection with U.S. Appl. No. 14/821,513, filed Aug. 7, 2016, 5 pages.
Preinterview First Office Action dated May 23, 2016, issued in connection with U.S. Appl. No. 14/495,684, filed Sep. 24, 2014, 6 pages.
Presentations at WinHEC 2000, May 2000, 138 pages.
PRISMIQ, Inc., "PRISMIQ Media Player User Guide," 2003, 44 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
U.S. Appl. No. 12/070,933, filed Feb. 22, 2008. "System, Method, and Computer Program for Remotely Managing a Digital Device" Inventor: Jonathan Lang, et al.
U.S. Appl. No. 13/533,105, filed Jun. 26, 2012. "Systems, Methods, Apparatus, and Articles of Manufacture to Provide a Crowd-Sourced Playlist with Guess Access" Inventor: Paul Bates, et al.
U.S. Appl. No. 13/533,785, filed Jun. 26, 2012. "Networked Music Playback Including Remote Discovery and Add to Queue" Inventor: Mark Triplett, et al.
U.S. Appl. No. 13/748,357, filed Jan. 23, 2013. "System and Method for a Media Experience Social Interface" Inventor: Ron Kuper, et al.
U.S. Appl. No. 13/871,785, filed Apr. 26, 2013. "Systems, Methods, Apparatus, and Articles of Manufacture to Provide Guest Access" Inventor: Paul Bates, et al.
U.S. Appl. No. 13/871,795, filed Jun. 20, 2013. "Systems, Methods, Apparatus, and Articles of Manufacture to Provide Guest Access" Inventor: Paul Bates, et al.
U.S. Appl. No. 14/173,253, filed Feb. 5, 2014. "Remote Creation of a Playback Queue for a Future Event" Inventor: Jaime Munoz, et al.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 32 manual: copyright 2001.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Chinese Patent Office, First Office Action dated Sep. 4, 2017, issued in connection with Chinese Application No. 2014800172148.0, 16 pages.
Chinese Patent Office, Second Office Action dated Apr. 11, 2018, issued in connection with Chinese Application No. 201480017214.8, 7 pages.
European Patent Office, EP Supplemental Search dated Dec. 19, 2017, issued in connection with EP Application No. 15829058.5, 12 pages.
European Patent Office, European Extended Search Report dated Feb. 5, 2018, issued in connection with EP Application No. 15803430.6, 8 pages.
European Patent Office, Summons to Attend Oral Proceedings mailed on Mar. 27, 2018, issued in connection with European Patent Application No. 15781794.1, 11 pages.
Final Office Action dated Nov. 2, 2017, issued in connection with U.S. Appl. No. 14/275,112, filed May 12, 2014, 20 pages.
Final Office Action dated Jan. 19, 2018, issued in connection with U.S. Appl. No. 14/297,193, filed Jun. 5, 2014, 32 pages.
Final Office Action dated Mar. 28, 2018, issued in connection with U.S. Appl. No. 14/495,633, filed Sep. 24, 2014, 21 pages.
Japanese Patent Office, Full English Translation of Office Action dated Nov. 28, 2017, issued in connection with Japanese Patent Application No. 2016-555529, 2 pages.
Japanese Patent Office, Office Action dated Nov. 28, 2017, issued in connection with Japanese Patent Application No. 2016-555529, 5 pages.
Japanese Patent Office, Office Action dated Nov. 7, 2017, issued in connection with Japanese Patent Application No. 2016-550231, 5 pages.
Non-Final Office Action dated Jun. 21, 2018, issued in connection with U.S. Appl. No. 15/692,090, filed Aug. 31, 2017, 20 pages.
Non-Final Office Action dated Mar. 23, 2018, issued in connection with U.S. Appl. No. 15/227,074, filed Aug. 3, 2016, 11 pages.
Non-Final Office Action dated Jan. 24, 2018, issued in connection with U.S. Appl. No. 15/607,267, filed May 26, 2017, 17 pages.
Non-Final Office Action dated Nov. 28, 2017, issued in connection with U.S. Appl. No. 14/821,513, filed Aug. 7, 2015, 17 pages.
Notice of Allowance dated Dec. 27, 2017, issued in connection with U.S. Appl. No. 14/495,659, filed Sep. 24, 2014, 6 pages.
Advisory Action dated Feb. 1, 2017, issued in connection with U.S. Appl. No. 14/297,193, filed Jun. 5, 2014, 6 pages.
Advisory Action dated Feb. 3, 2017, issued in connection with U.S. Appl. No. 14/495,659, filed Sep. 24, 2014, 5 pages.
Advisory Action dated Jul. 12, 2016, issued in connection with U.S. Appl. No. 14/173,253, filed Feb. 5, 2014, 5 pages.
Advisory Action dated Aug. 22, 2017, issued in connection with U.S. Appl. No. 14/173,253, filed Feb. 5, 2014, 4 pages.
Akyildiz et al., "Multimedia Group Synchronization Protocols for Integrated Services Networks," IEEE Journal on Selected Areas in Communications, 1996 pp. 162-173, vol. 14, No. 1.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Benslimane Abderrahim, "A Multimedia Synchronization Protocol for Multicast Groups," Proceedings of the 26th Euromicro Conference, 2000, pp. 456-463, vol. 1.
Biersack et al., "Intra- and Inter-Stream Synchronization for Stored Multimedia Streams," IEEE International Conference on Multimedia Computing and Systems, 1996, pp. 372-381.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Bretl W.E., et al., MPEG2 Tutorial [online], 2000 [retrieved on Jan. 13, 2009] Retrieved from the Internet:, pp. 1-23.
Corrected Notice of Allowability dated Jan. 19, 2017, issued in connection with U.S. Appl. No. 14/197,403, filed Mar. 5, 2014, 2 pages.
Dell, Inc. "Dell Digital Audio Receiver: Reference Guide," Jun. 2000, 70 pages.
Dell, Inc. "Start Here," Jun. 2000, 2 pages.

(56) References Cited

OTHER PUBLICATIONS

"Denon 2003-2004 Product Catalog," Denon, 2003-2004, 44 pages.
European Patent Office, European Office Action dated Aug. 3, 2017, issued in connection with EP Application No. 15781794.1, 6 pages.
European Patent Office, European Supplemental Search Report dated Sep. 18, 2017, issued in connection with EP Application No. 15829058.5, 13 pages.
European Patent Office, European Supplemental Search Report dated Jan. 27, 2016, issued in connection with European Application No. 14743335.3, 8 pages.
European Patent Office, Examination Report dated Feb. 3, 2017, issued in connection with European Patent Application No. 14743335.3, 5 pages.
European Patent Office, Extended European Search Report dated Mar. 15, 2017, issued in connection with European Application No. 15758460.8, 9 pages.
European Patent Office, Extended European Search Report dated Dec. 23, 2016, issued in connection with European Application No. 15746781.2, 10 pages.
European Patent Office, Office Action dated Mar. 2, 2017, issued in connection with European Application No. 15775566.1, 7 pages.
European Patent Office, Office Action dated Apr. 4, 2017, issued in connection with European Application No. 15775897.0, 6 pages.
European Patent Office, Office Action dated Jan. 13, 2017, issued in connection with European Application No. 15781794.1, 8 pages.
European Patent Office, Office Action dated Mar. 13, 2017, issued in connection with European Application No. 15781200.9, 5 pages.
Final Office Action dated Nov. 3, 2016, issued in connection with U.S. Appl. No. 14/495,684, filed Sep. 24, 2014, 16 pages.
Final Office Action dated Apr. 6, 2016, issued in connection with U.S. Appl. No. 14/173,253, filed Feb. 5, 2014, 20 pages.
Final Office Action dated Feb. 7, 2017, issued in connection with U.S. Appl. No. 14/455,651, filed Aug. 8, 2014, 22 pages.
Final Office Action dated Oct. 7, 2016, issued in connection with U.S. Appl. No. 14/495,595, filed Sep. 24, 2014, 16 pages.
Final Office Action dated Nov. 8, 2016, issued in connection with U.S. Appl. No. 14/495,659, filed Sep. 24, 2014, 14 pages.
Final Office Action dated Feb. 10, 2016, issued in connection with U.S. Appl. No. 14/197,403, filed Mar. 5, 2014, 21 pages.
Final Office Action dated Feb. 16, 2017, issued in connection with U.S. Appl. No. 14/495,633, filed Sep. 24, 2014, 15 pages.
Final Office Action dated Sep. 16, 2016, issued in connection with U.S. Appl. No. 14/275,112, filed May 12, 2014, 19 pages.
Final Office Action dated Oct. 20, 2016, issued in connection with U.S. Appl. No. 14/197,403, filed Mar. 5, 2016, 17 pages.
Final Office Action dated Sep. 30, 2016, issued in connection with U.S. Appl. No. 14/297,193, filed Jun. 5, 2014, 34 pages.
Final Office Action dated May 31, 2017, issued in connection with U.S. Appl. No. 14/173,253, filed Feb. 5, 2014, 22 pages.
Final Office Action dated May 31, 2017, issued in connection with U.S. Appl. No. 14/821,513, filed Aug. 7, 2015, 16 pages.
First Action Interview Office Action dated Apr. 4, 2016, issued in connection with U.S. Appl. No. 14/275,112, filed May 12, 2014, 8 pages.
First Action Interview Office Action dated Jul. 7, 2016, issued in connection with U.S. Appl. No. 14/495,595, filed Sep. 24, 2014, 6 pages.
First Action Interview Office Action dated Jul. 11, 2016, issued in connection with U.S. Appl. No. 14/495,684, filed Sep. 24, 2014, 8 pages.
First Action Interview Office Action dated Jul. 13, 2016, issued in connection with U.S. Appl. No. 14/455,651, filed Aug. 8, 2014, 10 pages.
First Action Interview Office Action dated Oct. 13, 2016, issued in connection with U.S. Appl. No. 14/495,633, filed Sep. 24, 2014, 8 pages.
First Action Interview Office Action dated Dec. 14, 2016, issued in connection with U.S. Appl. No. 14/821,513, filed Aug. 7, 2015, 10 pages.
First Action Interview Office Action dated Jul. 22, 2016, issued in connection with U.S. Appl. No. 14/495,659, filed Sep. 24, 2014, 8 pages.
First Action Interview Pilot Program Pre-Interview Communication dated Oct. 28, 2015, issued in connection with U.S. Appl. No. 14/275,112, filed May 12, 2014, 4 pages.
First Action Interview Pilot Program Pre-Interview Communication dated Apr. 3, 2017, issued in connection with U.S. Appl. No. 14/495,590, filed Sep. 24, 2014, 5 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
International Bureau, International Preliminary Report on Patentability dated Jan. 30, 2014, issued in connection with International Application No. PCT/US2012/047620, filed on Jul. 20, 2012, 7 pages.
Chinese Patent Office, First Office Action and Translation dated Feb. 2, 2019, issued in connection with Chinese Application No. 201580011640.5, 12 pages.
Chinese Patent Office, First Office Action dated Feb. 27, 2019, issued in connection with Chinese Application No. 201580007534.X, 9 pages.
Chinese Patent Office, Third Office Action dated Oct. 18, 2018, issued in connection with Chinese Application No. 2014800172148, 8 pages.
European Patent Office, Decision to Refuse EP Application dated Oct. 16, 2018, issued in connection with European Application No. 157758970, 48 pages.
European Patent Office, Decision to Refuse EP Application dated Sep. 27, 2018, issued in connection with European Application No. 15781794.1, 54 pages.
European Patent Office, European Office Action dated Jan. 2, 2019, issued in connection with European Application No. 15829058.5, 4 pages.
Final Office Action dated Oct. 29, 2018, issued in connection with U.S. Appl. No. 15/607,267, filed May 26, 2017, 17 pages.
Non-Final Office Action dated Nov. 13, 2018, issued in connection with U.S. Appl. No. 16/143,301, filed Sep. 26, 2018, 27 pages.
Non-Final Office Action dated Jan. 16, 2019, issued in connection with U.S. Appl. No. 15/664,634, filed Jul. 31, 2017, 17 pages.
Non-Final Office Action dated Feb. 19, 2019, issued in connection with U.S. Appl. No. 15/966,337, filed Apr. 30, 2018, 14 pages.
Non-Final Office Action dated Mar. 19, 2019, issued in connection with U.S. Appl. No. 15/607,267, filed May 26, 2017, 18 pages.
Non-Final Office Action dated Jan. 22, 2019, issued in connection with U.S. Appl. No. 16/174,703, filed Oct. 30, 2018, 15 pages.
Non-Final Office Action dated Dec. 27, 2018, issued in connection with U.S. Appl. No. 14/297,193, filed Jun. 5, 2014, 37 pages.
Non-Final Office Action dated Apr. 4, 2019, issued in connection with U.S. Appl. No. 15/612,126, filed Jun. 2, 2017, 9 pages.
Non-Final Office Action dated Dec. 6, 2018, issued in connection with U.S. Appl. No. 14/495,633, filed Sep. 24, 2014, 15 pages.
Notice of Allowance dated Feb. 11, 2019, issued in connection with U.S. Appl. No. 15/692,090, filed Aug. 31, 2017, 8 pages.
Notice of Allowance dated Feb. 11, 2019, issued in connection with U.S. Appl. No. 16/143,301, filed Sep. 26, 2018, 15 pages.
Notice of Allowance dated Jul. 18, 2018, issued in connection with U.S. Appl. No. 15/227,074, filed Aug. 3, 2016, 8 pages.
Notice of Allowance dated Aug. 30, 2018, issued in connection with U.S. Appl. No. 14/821,513, filed Aug. 7, 2015, 10 pages.
Pre-Brief Conference Decision mailed on Sep. 7, 2018, issued in connection with U.S. Appl. No. 14/297,193, filed Jun. 5, 2014, 2 pages.
Advisory Action dated Sep. 11, 2019, issued in connection with U.S. Appl. No. 14/495,633, filed Sep. 24, 2014, 3 pages.
Advisory Action dated Oct. 21, 2019, issued in connection with U.S. Appl. No. 15/664,634, filed Jul. 31, 2017, 4 pages.
Advisory Action dated Nov. 25, 2019, issued in connection with U.S. Appl. No. 15/607,267, filed May 26, 2017, 5 pages.
Advisory Action dated Oct. 25, 2019, issued in connection with U.S. Appl. No. 15/966,337, filed Apr. 30, 2018, 4 pages.

(56) References Cited

OTHER PUBLICATIONS

Anonymous: "Email Parser Tool—customizable email parsing software by ITG," May 17, 2014, [online] Retrieved from the Internet on Nov. 5, 2019: (URL:https//web.archive.org/web/20140517050139://emailparser.net/).

European Patent Office, European Office Action dated Nov. 13, 2019, issued in connection with European Application No. 15829058.5, 8 pages.

European Patent Office, Summons to Attend Oral Proceedings mailed on Jun. 11, 2019, issued in connection with European Application No. 14743335.3, 10 pages.

Final Office Action dated Oct. 2, 2019, issued in connection with U.S. Appl. No. 14/297,193, filed Jun. 5, 2014, 47 pages.

Final Office Action dated Oct. 3, 2019, issued in connection with U.S. Appl. No. 16/174,703, filed Oct. 30, 2018, 17 pages.

Final Office Action dated Aug. 20, 2019, issued in connection with U.S. Appl. No. 15/607,267, filed May 26, 2017, 19 pages.

Final Office Action dated Jul. 31, 2019, issued in connection with U.S. Appl. No. 15/664,634, filed Jul. 31, 2017, 16 pages.

Final Office Action dated Jul. 5, 2019, issued in connection with U.S. Appl. No. 14/495,633, filed Sep. 24, 2014, 16 pages.

Final Office Action dated Jul. 5, 2019, issued in connection with U.S. Appl. No. 15/966,337, filed Apr. 30, 2018, 16 pages.

First Action Interview Office Action dated Nov. 14, 2019, issued in connection with U.S. Appl. No. 16/188,186, filed Nov. 12, 2018, 14 pages.

First Action Interview Office Action dated Jan. 17, 2020, issued in connection with U.S. Appl. No. 16/188,186, filed Nov. 12, 2018, 14 pages.

Non-Final Office Action dated May 12, 2020, issued in connection with U.S. Appl. No. 16/516,767, filed Jul. 19, 2019, 12 pages.

Non-Final Office Action dated Mar. 13, 2020, issued in connection with U.S. Appl. No. 15/664,634, filed Jul. 31, 2017, 20 pages.

Non-Final Office Action dated Jan. 14, 2020, issued in connection with U.S. Appl. No. 15/966,337, filed Apr. 30, 2018, 16 pages.

Non-Final Office Action dated Apr. 28, 2020, issued in connection with U.S. Appl. No. 14/297,193, filed Jun. 5, 2014, 34 pages.

Non-Final Office Action dated Aug. 4, 2020, issued in connection with U.S. Appl. No. 16/812,638, filed Mar. 9, 2020, 13 pages.

Notice of Allowance dated Apr. 10, 2020, issued in connection with U.S. Appl. No. 16/188,186, filed Nov. 12, 2018, 10 pages.

Notice of Allowance dated Dec. 17, 2019, issued in connection with U.S. Appl. No. 16/174,703, filed Oct. 30, 2018, 11 pages.

Notice of Allowance dated Jan. 17, 2020, issued in connection with U.S. Appl. No. 15/612,126, filed Jun. 2, 2017, 5 pages.

Notice of Allowance dated Jul. 21, 2020, issued in connection with U.S. Appl. No. 15/966,337, filed Apr. 30, 2018, 11 pages.

Notice of Allowance dated Dec. 27, 2019, issued in connection with U.S. Appl. No. 14/495,633, filed Sep. 24, 2014, 7 pages.

Notice of Allowance dated Apr. 28, 2020, issued in connection with U.S. Appl. No. 15/612,126, filed Jun. 2, 2017, 5 pages.

Notice of Allowance dated Oct. 30, 2019, issued in connection with U.S. Appl. No. 16/458,453, filed Jul. 1, 2019, 7 pages.

Notice of Allowance dated Aug. 5, 2019, issued in connection with U.S. Appl. No. 15/612,126, filed Jun. 2, 2017, 5 pages.

Notice of Allowance dated Aug. 5, 2020, issued in connection with U.S. Appl. No. 16/188,186, filed Nov. 12, 2018, 11 pages.

Yamaha DME Designer 3.0 Owner's Manual; Copyright 2008, 501 pages.

* cited by examiner

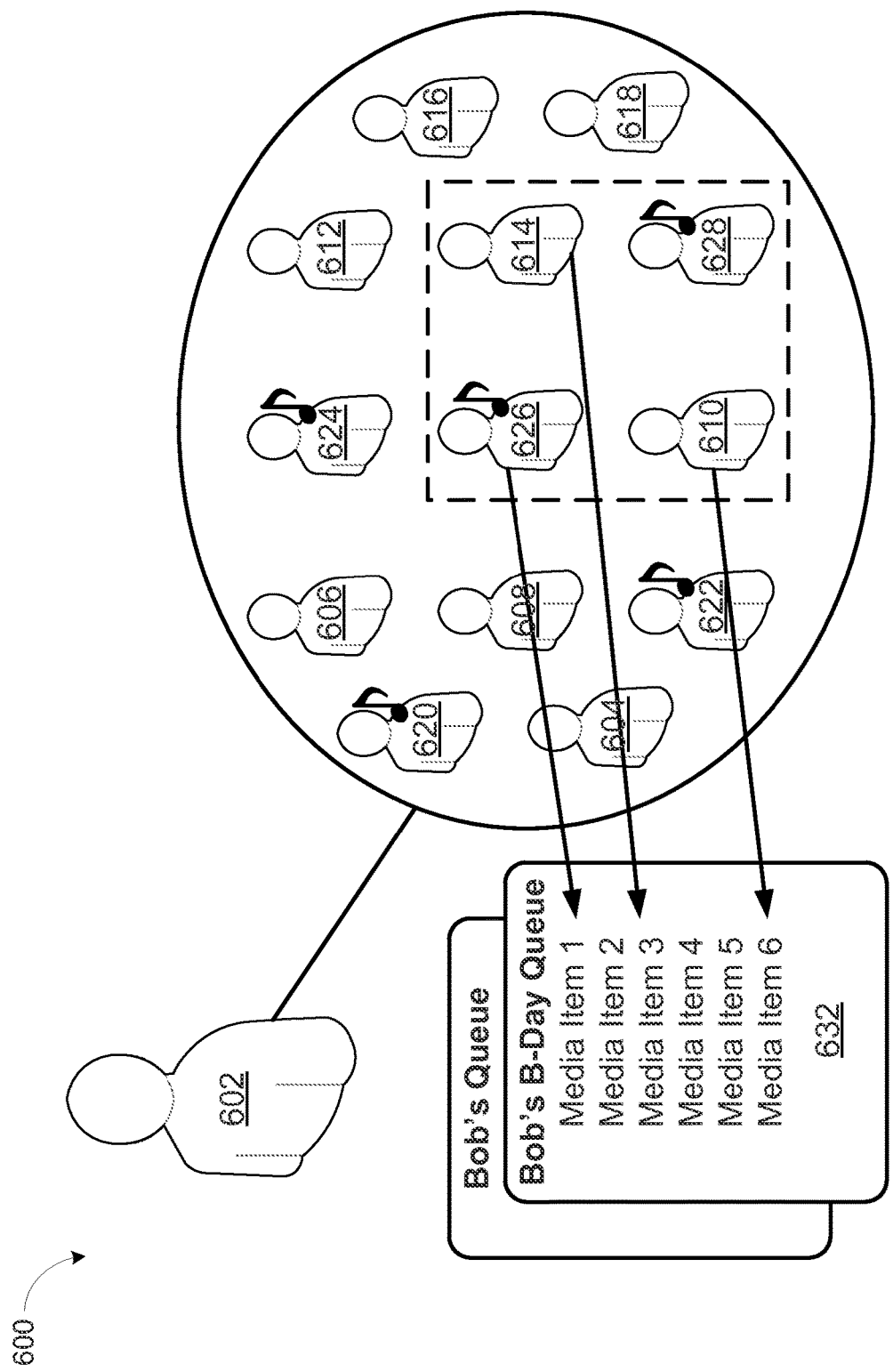

SOCIAL MEDIA QUEUE

CROSS REFERENCE TO RELATED APPLICATIONS

This application is a continuation of U.S. application Ser. No. 14/495,595, titled "Social Media Queue," filed Sep. 24, 2014, and currently pending. The entire contents of the Ser. No. 14/495,595 application are incorporated herein by reference. This application also incorporates the entire contents of the following applications by reference: (i) U.S. application Ser. No. 14/495,633, titled "Playback Updates," filed on Sep. 24, 2014, and currently pending; (ii) U.S. application Ser. No. 14/495,706, titled "Indicating an Association Between a Social-Media Account and a Media Playback System," filed Sep. 24, 2014, and scheduled to issue on Mar. 30, 2017, as U.S. Pat. No. 9,667,679; (iii) U.S. application Ser. No. 14/495,590, titled "Associating a Captured Image with a Media Item," filed Sep. 24, 2014, and currently pending; (iv) U.S. application Ser. No. 14/495,659, titled "Media Item Context from Social Media," filed Sep. 24, 2014, and currently pending; (v) U.S. application Ser. No. 14/495,684, titled "Social Media Connection Recommendations Based on Playback Information," filed Sep. 24, 2014, and currently pending.

FIELD OF THE DISCLOSURE

The disclosure is related to consumer goods and, more particularly, to methods, systems, products, features, services, and other items directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 6C is a conceptual illustration of a social-media-event playback queue;

Figure 1:
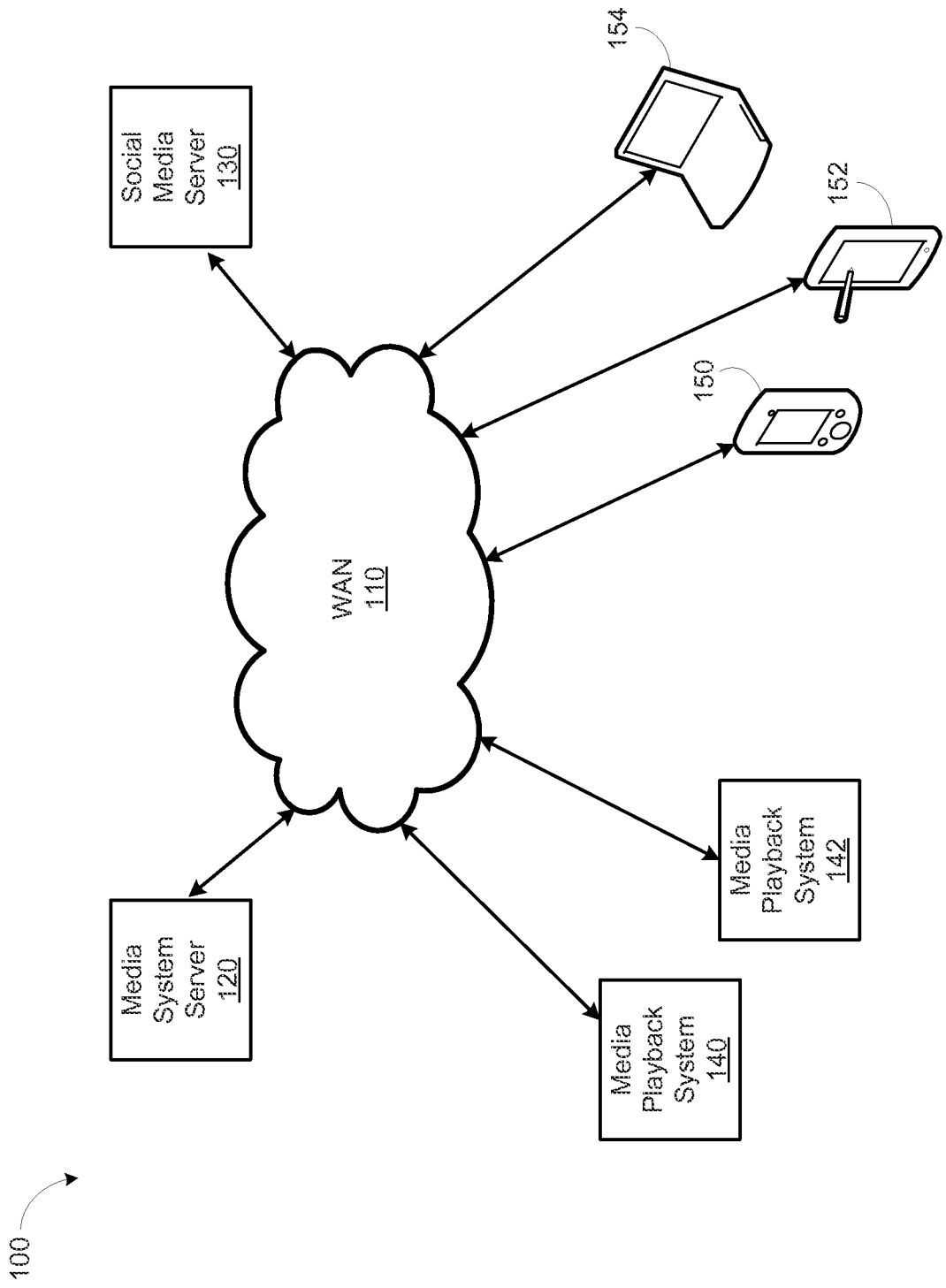
FIG. 1 shows an example network configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

According to examples described herein, a social-media network may provide subscribers access to social-media playback queues. Such queues may be populated and modified by "friends" within the social-media network. Moreover, a media playback system that is linked to a social-media account within the social-media network may play back a social-media playback queue. In this way, social-media "friends" may contribute to and share in one another's media playback experiences.

Today, social-media networks have become commonplace and may be accessed using any number of computing devices. Indeed, it is common for subscribers to be members of more than one social network. Social-media networks allow subscribers to share their life experiences and help friends and family to stay in touch. A subscriber may share as much or as little personal information that he or she desires.

In examples, a computing device may be connected to (e.g., via a social-media application) a social-media server that hosts a social-media network, and the computing device may receive data indicating a media playback system. For example, when a subscriber first joins the social-media network, the subscriber may provide certain background information, which may include whether the subscriber has a particular type of media playback system. The computing device may detect inputs from the subscriber that identify a media playback system. The computing device may then provide to the social-media server an identifier of the media playback system.

Alternatively, the media playback system may provide the identifier to the social-media server. For example, before the media playback system is operable, one or more setup procedures may first be performed. One such procedure may request that the user provide account information for a particular social-media service. The media playback system may receive an indication of account information for a social-media service and then transmit to the social-media server of that service an identifier of the media playback system.

After the social-media server receives the identifier, the social-media server may link the identifier with a social-media account. For instance, continuing off of the above example, after the subscriber provides the background information that includes identification of the media playback system, the social-media server may then link the media playback system with the new social-media account. In this way, the media playback system is associated with the social-media account and may be controlled by certain social-media activities, as discussed in further detail below.

Based on linking the identifier with the social-media account, the social-media server may generate a social-media playback queue associated with the social-media account. The social-media playback queue may be Tillable with media items that are playable by the media playback system that is linked with the social-media account. In examples, the subscriber may access the social-media playback queue through the social-media network (e.g., via a web browser or social-media application running on a computing device) or through the media playback system (e.g., via a controller of the media playback system).

Moreover, other social-media subscribers may also access the social-media playback queue. In examples, after the social-media playback queue is generated, the social-media server may establish access permissions to the social-media playback queue. Access permissions may designate other subscribers that may access the social-media playback queue, such as "friends of the subscriber. Further, the access permissions may define what actions other subscribers may perform with the social-media playback queue. For example, an access permission may allow all social-media subscribers to view the social-media playback queue, another access permission may allow all "friends" of the subscriber to populate and modify the queue, and yet another access permission may allow "friends" that also have a linked media playback system to play back the queue. Other example access permissions are also possible.

After the access permissions have been established, the other subscribers may access the social-media playback queue. In examples, other subscribers with the appropriate access permissions may view a representation of the social-media playback queue via the social network. For instance, the other subscribers may view the social-media playback queue through the subscriber's social-media profile, wall, or the like. Moreover, other subscribers with the appropriate access permissions may contribute to the social-media playback queue by adding, deleting, or rearranging the order of media items in the social-media playback queue.

In some examples, one of the other subscribers may have a linked media playback system as well. This media playback system may receive an indication of the social-media playback queue. The one other subscriber may use his or her linked media playback system (e.g., a controller of that media playback system) to select a media item to be added to the social-media playback queue. The media playback system may receive data indicating the media item and then transmit to the social-media server an indication of the media item to be added to the queue.

The social-media server may receive this indication and then add the media item to the social-media playback queue. At this point, any subscriber with the appropriate access permissions may play back the media item in the social-media playback queue. Indeed, multiple subscribers may access the social-media playback queue and play back the media item at the same time, perhaps in synchrony. A given subscriber may play back the media item through a web browser or social-media application on a computing device or through a linked media playback system, provided the given subscriber has a linked playback system, among other examples.

In one example, the one other subscriber may play back the media item through his or her linked media playback system. In particular, the media playback system may receive a playback prompt instructing the media playback system to play back the social-media playback queue. The media playback system may then obtain the media item for play back.

Any given social-media subscriber may have multiple social-media playback queues. That is, a social-media account may be linked to multiple social-media playback queues. In some examples, a social-media playback queue may be generated when a social-media event is created by a subscriber with a linked media playback system. Access to such a queue may be limited to those "friends" that the subscriber invites to the event. In such examples, invited "friends" may add media items to the social-media playback queue prior to the event, and the social-media server may track which items a particular "friend" adds.

At the event, a linked media playback system may play back the social-media playback queue that was generated in response to the social-media event being created. In some examples, before the linked media playback system plays a given media item from the social-media playback queue, the media playback system may first enable the media item for play back.

Enabling a media item for play back may be performed in a number of manners. For example, when a "friend" arrives at the event, the "friend" may "check in" to the event through the social-media network (e.g., via the wall for the social-media event) using his or her smartphone. The media playback system may receive from the social-media server an indication of the "check in", and in turn, the media playback system may then enable any media items that the "friend" added to the social-media playback queue. In some examples, in addition to enabling the media items, the media playback system may move one or more media items up in the playback queue so that one of the "friend's" added media items plays back relatively close to the time of the "check in." Other examples are also possible.

As indicated above, examples provided herein are directed to social-media playback queues. In one aspect, a method is provided. The method involves (i) receiving, by a computing system, an identifier of a media playback system, (ii) linking the identifier with a social-media account such that the media playback system is associated with the social-media account, (iii) based at least on linking the identifier with the social-media account, generating a social-media playback queue that is fillable with one or more media items that are playable by the media playback system, (iv) establishing access permissions to the social-media playback queue, wherein the access permissions indicate at least one additional social-media account that (a) is within a social-media network of the social-media account and (b) has access to the social-media playback queue, (v) receiving, by the computing system from a computing device affiliated with the at least one additional social-media account, an indication of a media item to be added to the social-media playback queue, and (vi) adding the media item to the social-media playback queue.

In another aspect, a computing system is provided. The computing system comprises a network interface, a processing unit, a non-transitory computer-readable medium, and program instructions stored on the non-transitory computer-readable medium. The program instructions are executable by the processing unit and when executed cause the computing system to (i) receive an identifier of a media playback system, (ii) link the identifier with a social-media account such that the media playback system is associated with the social-media account, (iii) based at least on linking the identifier with the social-media account, generate a social-media playback queue that is fillable with one or more media items that are playable by the media playback system, (iv) establish access permissions to the social-media playback queue, wherein the access permissions indicate at least one additional social-media account that (a) is within a social-media network of the social-media account and (b) has access to the social-media playback queue, (v) receive, from a computing device affiliated with the at least one additional social-media account, an indication of a media item to be added to the social-media playback queue, and (vi) add the media item to the social-media playback queue.

In yet another aspect, a non-transitory computer-readable medium is provided. The non-transitory computer-readable medium having instructions stored thereon that are executable by a computing system to cause the computing system to (i) receive an identifier of a media playback system, (ii) link the identifier with a social-media account such that the media playback system is associated with the social-media account, (iii) based at least on linking the identifier with the social-media account, generate a social-media playback queue that is fillable with one or more media items that are playable by the media playback system, (iv) establish access permissions to the social-media playback queue, wherein the access permissions indicate at least one additional social-media account that (a) is within a social-media network of the social-media account and (b) has access to the social-media playback queue, (v) receive, from a computing device affiliated with the at least one additional social-media account, an indication of a media item to be added to the social-media playback queue, and (vi) add the media item to the social-media playback queue.

In an additional aspect, a method is provided. The method involves (i) transmitting, by a media playback device to a social-media computing system, an identifier of the media playback system to facilitate associating the media playback system with a first social-media account, (ii) receiving, by the media playback device from the social-media computing system, an indication of a social-media playback queue corresponding to a second social-media account, wherein the second social-media account is within a social-media network of the first social-media account, (iii) receiving, by a media playback device, a playback prompt instructing the media playback device to play back the social-media playback queue, and (iv) obtaining, by the media playback device, one or more media items in the social-media playback queue for play back by the media playback device.

In another aspect, a media playback device is provided. The media playback device comprises one or more media processing components, at least one processor, a non-transitory computer-readable medium and program instructions stored on the non-transitory computer-readable medium. The program instructions are executable by the at least one processor and when executed cause the media playback device to (i) transmit, to a social-media computing system, an identifier of the media playback system to facilitate associating the media playback system with a first social-media account, (ii) receive, from the social-media computing system, an indication of a social-media playback queue corresponding to a second social-media account, wherein the second social-media account is within a social-media network of the first social-media account, (iii) receive a playback prompt instructing the media playback device to play back the social-media playback queue, and (iv) obtain one or more media items in the social-media playback queue for play back by the media playback device.

In one other aspect, a non-transitory computer-readable medium is provided. The non-transitory computer-readable medium having instructions stored thereon that are executable by a media playback system to cause the media playback system to (i) transmit, to a social-media computing system, an identifier of the media playback system to facilitate associating the media playback system with a first social-media account, (ii) receive, from the social-media computing system, an indication of a social-media playback queue corresponding to a second social-media account, wherein the second social-media account is within a social-media network of the first social-media account, (iii) receive a playback prompt instructing the media playback device to play back the social-media playback queue, and (iv) obtain one or more media items in the social-media playback queue for play back by the media playback device.

It will be understood by one of ordinary skill in the art that this disclosure includes numerous other embodiments.

II. Example Network Configuration

FIG. 1 shows an example network configuration 100 in which one or more embodiments disclosed herein may be practiced or implemented. As shown, the network configuration 100 includes a wide area network ("WAN") 110 that communicatively couples a media system server 120, a social-media server 130, one or more media playback systems 140 and 142, and one or more computing devices 150, 152, and 154. It should be understood that the network configuration 100 may include more or fewer of the depicted network elements and/or may include various other network elements not shown in FIG. 1 (e.g. one or more media sources).

In examples, the WAN 110 may include the Internet and/or one or more cellular networks, among other networks. Although the WAN 110 is shown as one network, it should be understood that the WAN 110 may include multiple, distinct WANs that are themselves communicatively linked. The WAN 110 may facilitate transferring data between one or more of the various network elements shown in FIG. 1. In some examples, a given network element may communicate with another network element through yet another network element. For instance, the media playback systems 140 and 142 may communicate with the social-media server 130 through the media system server 120 and/or the computing devices 150-154 may communicate with the media system server 120 through the social-media server 130. Other examples are also possible.

In some examples, certain network elements may be communicatively coupled to other network elements via means other than the WAN 110. In particular, certain network elements may be communicatively coupled via a local area network (e.g., via WiFi), a personal area network (e.g., via Bluetooth), and/or other connections (e.g., via a wired connection). For example, the computing device 150 may communicate with the media playback system 140 via a local area network (e.g., WiFi or perhaps according to a proprietary protocol). The computing device 150 may do so while operating as part of the media playback system 140 (e.g., as a control device).

The media system server 120 may include a network interface, a processing unit, and data storage, all of which may be communicatively linked together by a system bus, network, or other connection mechanism. The network interface may facilitate data flow over the WAN 110 between the media system server 120 and other network elements. The processing unit may include one or more general purpose processors and/or one or more special purpose processors and may be integrated in whole or in part with the network interface. The data storage may include a non-transitory computer-readable medium, such as optical, magnetic, or flash memory, and may be integrated in whole or in part with the processing unit. The data storage may also include program instructions that are executable by the processing unit to carry out various operations described herein.

Moreover, the media system server 120 may be configured to store and/or access various data related to media items and/or media playback systems. In examples, the media system server 120 may be configured to store and/or access media items that are playable by a media playback system. In such examples, the media system server 120 may be configured to provide to a given media playback system media items (e.g., audio, video, and/or audio-visual files) or links, pointers, or other network location identifiers that are operable to locate the media items. Additionally, the media system server 120 may be configured to store and/or access a cross-service linking database that facilitates identifying a media item from a first media source based on media item information from a second media source.

The media system server 120 may also be configured to provide one or more media applications to the media playback systems 140-142 and/or the computing devices 150-154. In some cases, a media application may be operable to allow a computing device to control one or more media playback systems. Additionally or alternatively, a media application may be operable to allow a media playback system to interface with the social-media server 130 and playback media items based on social-media data. Further still, a media application may be operable to provide functions similar to those provided by a social-media application, discussed in further detail below. Other example media applications are also possible.

In examples, the media system server 120 may be configured to store and/or access account information corresponding to a particular media playback system. Such information, which may be collectively referred herein as a "playback system account", may include system information (e.g., a household identifier (HHID) that is used to uniquely identify the particular media playback system, identifiers of the devices within the particular system, the software version currently installed on the particular media playback system, etc.) user information (e.g., name, date of birth, etc. of the user or users of the particular system), playback history information (e.g., media items previously played on the particular system and perhaps timestamps indicating when such media items were played), playback preference information (e.g., frequency at which a given media item is played, indications of media items that have been "liked" or "starred", etc.), and linked-account information (e.g., one or more social-media accounts that are linked to the particular media playback system). Other examples of information storable and accessible by the media system server 120 are also possible.

In some examples, a playback system account may also include information regarding the media services that provide media to the particular media playback system. For example, the playback system account may include one or more identifiers of media services that provide media to the particular media playback system. Such information may be used by the media system server 120, or perhaps the social-media server 130, to recommend media services that a user might be interested in. Other examples are also possible.

In practice, the media system server 120 may store some or all of the above-discussed information based on data received from media playback systems (e.g., the media playback systems 140 and 142), the social-media server 130, and/or the computing devices 150-154. In examples, such information may be provided to the media system server 120 when a media playback system is first setup, when a media playback system plays back media items, when a media playback system receives data indicating user feedback, and/or when a computing device runs a media application to control a media playback system, among other scenarios. In any event, the media system server 120 may be configured to provide an option to a user to "opt in" so that the aforementioned information is collected by the media system server 120.

The media system server 120 may be further configured to use the above-discussed information to determine playback behaviors of users of media playback systems, among other operations. Based on user playback behaviors, the media system server 120 may perform a number of operations that may add to the users' playback experience. For example, such information may be used to identify a trending artist and then recommend that trending artist to a user whose playback history indicates he or she listens to other artists similar to the trending artist. Other examples are certainly possible.

The social-media server 130 may include a network interface, a processing unit, and data storage, similar to those of the media system server 120 discussed above. The social-media server 130 may be configured to provide a social-media service to subscribers to the service. For example, the social-media server 130 may be configured to establish and/or maintain a social network. To this end, the social-media server 130 may be configured to host a social-media webpage accessible over the WAN 110 by subscribers utilizing any suitable computing device, such as the computing devices 150-154.

In examples, the social-media server 130 may be configured to store subscriber account information, which may be collectively referred herein as a "social media account". Such information may include the name, gender, birthdate, email address, and/or residential address, among other information, for each subscriber. Moreover, the social-media server 130 may also be configured to link a given subscriber with a particular media playback system. For example, when a user first subscribes to the social-media service, the user may provide information, such as an HHID, of a media playback system used by the user, and the social-media server 130 may then store such information in the account of the subscriber.

In addition to subscriber account information, the social-media server 130 may also be configured to store respective subscriber profiles for each subscriber. Broadly speaking, a subscriber profile may include information regarding a subscriber's life, such as relationship status, photos, videos, career information, education information, hobbies/interests, locations visited (e.g., "check-in" locations), sports teams that the subscriber is a fan of, and/or movies, books, artists, TV shows, and the like that the subscriber previously experienced and perhaps enjoyed. Such information may be presented on a subscriber profile in a number of manners, such as through subscriber posts, status updates, blogs, and other uploads.

The social network provided by the social-media server 130 may be configured so that subscribers may readily share and exchange information, ideas, creations, and the like over a virtual community. The social-media service may provide to its subscribers, via a social-media webpage, respective social-media information that is determined to be relevant to a particular subscriber. Such information may be provided in several manners (e.g., as a "news feed", "timeline", or the like) and may be personalized to fit the preferences of a particular subscriber. In examples, this information may be continuously updated to reflect the most current information that may be relevant to a particular subscriber.

A given subscriber may have certain "friends" that he/she chooses to associate with. After someone is deemed a "friend" with a given subscriber, the given subscriber may then receive social information that is uploaded, tagged, posted, or otherwise provided by the "friend." For example, the given subscriber's news feed may show a photograph that a "friend" captured and subsequently posted to the social-media webpage. Moreover, a listing of a given subscriber's "friends" may also be provided and that listing may include various information in various forms reflecting a current "status" or the like for a given "friend." The given subscriber may at also be able to "de-friend" someone that was previously deemed a "friend."

In practice, the social-media server 130 may be configured to collect and analyze the information that is shared and exchanged over the social-media service. The social-media server 130 may be configured to use this collected information, as well as subscriber account information, to determine for a particular subscriber other subscribers that the particular subscriber might want to become "friends" with. In this way, the social-media server 130 may be configured to determine the preferences and/or tastes of its subscribers and recommend other subscribers with similar tastes.

Moreover, the social-media server 130 may be configured to provide one or more social-media applications that are operable to provide subscribers access to the social-media service in a manner different than through a web browser. Such an application may be installed on a computing device that is perhaps portable. In examples, a social-media application may further be operable to provide functions similar to those provided by a media application, as discussed above.

Furthermore, a social-media application, and/or perhaps a media application, installed on a computing device may be operable to determine what, if any, other applications are also installed on the computing device. An application that is operable in such a manner may facilitate linking a playback system account with a social media account and vice versa. In examples, after a social-media application installed on a computing device is linked to a playback system account, the social-media application may be operable to affect playback of media at a media playback system identified by the playback system account.

In examples, the network configuration 100 may also include one or more media service provider servers communicatively coupled to the WAN 110. In general, a given media service provider server may correspond to a media service provider that provides streaming media, such as Internet radio and/or "on-demand" media, to the media playback systems 140-142 and/or the computing devices 150-154. A user may subscribe to such a service and register media devices (e.g., a media playback system and/or one or more computing devices) that may at times be used to access the media service. A media service provider server may include similar components as the servers discussed above.

Generally speaking, the media playback systems 140 and 142 may be any type of media playback system configured to receive and transmit data over a communication network and playback media items. In practice, each media playback system 140 and 142 may include one or more playback devices, as well as additional system devices (e.g., a controller device). An example media playback system is discussed in further detail below with reference to FIG. 2. It should be understood that the media playback system 140 and the media playback system 142 may be configured similarly or differently and/or may include similar or different devices.

In general, each computing device 150-154 may be any computing device configured to transfer data over a communication network. The computing devices 150-154 may each include at least one processor, memory, a graphical display, an input interface, and a network interface, among other components. In some instances, the graphical display and the input interface may be part of the same component (e.g., a touchscreen). The network interface may facilitate data flow between the computing device and another network element, for example, via the WAN 110. In some examples, one or more of the computing devices 150-154 may also include a camera configured to capture image and/or video data. Example computing devices include, but are not limited to, cellular phones, smartphones, PDAs, tablets, laptops, desktop computers, video game consoles, and smart TVs.

Moreover, the computing devices 150-154 may be configured to download, install, and operate an application, such as a media or social-media application. In examples, a given computing device may include a media application provided by the media system server 120 and a social-media application provided by the social-media server 130, while another computing device may include one or the other application but not both.

A computing device may be configured to run both applications at the same time or individually. In some examples, the computing devices 150-154 may provide to the media system server 120 and/or the social-media server 130 an indication of applications that are installed on a particular computing device. For instance, the computing device 150 may be configured to provide to the media system server 120 an indication that a social-media application is installed. Additionally or alternatively, the computing device 150 may be configured to provide to the social-media server 130 an indication that a media application is installed and/or active or otherwise currently running.

Furthermore, a computing device may be configured to provide social media information and/or media playback information to the media system server 120 and/or the social-media server 130. Such information may then be used by the media system server 120 and/or the social-media server 130 to help perform some of the operations disclosed in further detail below.

III. Example Media Playback System

Figure 2:
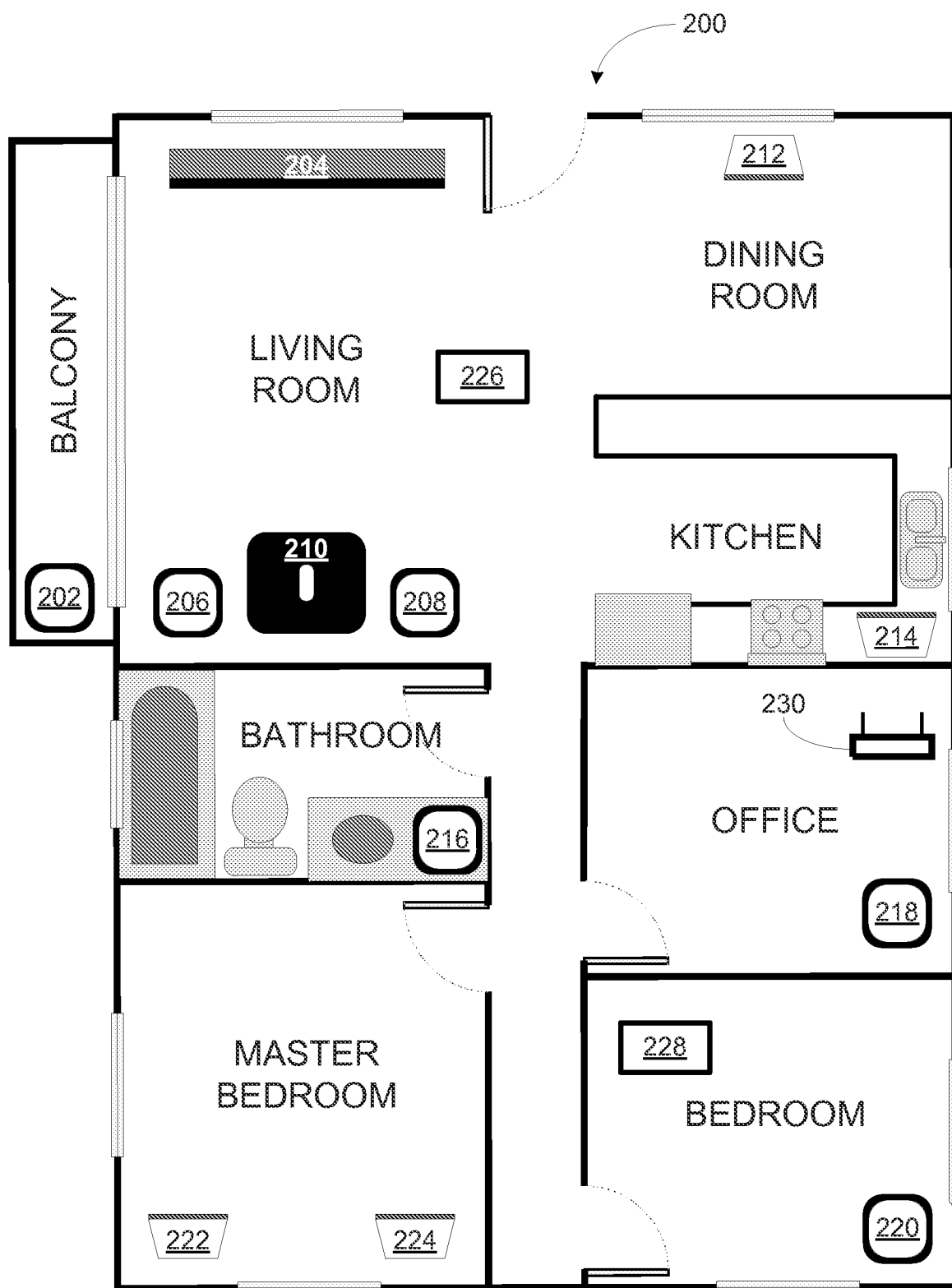
FIG. 2 shows an example media playback system configuration.

FIG. 2 shows an example configuration of a media playback system 200. The media playback system 200 as shown is associated with an example home environment having several rooms and spaces, such as for example, a master bedroom, an office, a dining room, and a living room. As shown in the example of FIG. 2, the media playback system 200 includes playback devices 202-224, control devices 226 and 228, and a wired or wireless network router 230.

Further discussions relating to the different components of the example media playback system 200 and how the different components may interact to provide a user with a media experience may be found in the following sections. While discussions herein may generally refer to the example media playback system 200, technologies described herein are not limited to applications within, among other things, the home environment as shown in FIG. 2. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 3:
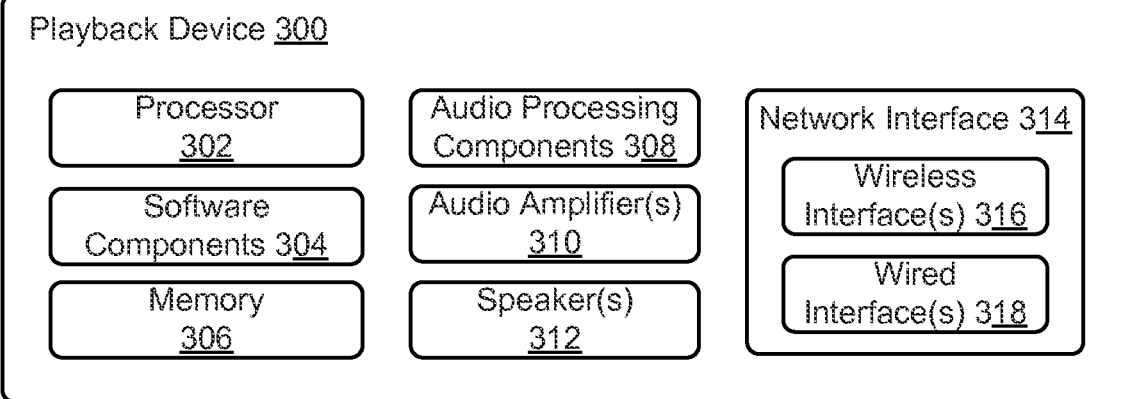
FIG. 3 shows a functional block diagram of an example playback device.

FIG. 3 shows a functional block diagram of an example playback device 300 that may be configured to be one or more of the playback devices 202-224 of the media playback system 200 of FIG. 2. The playback device 300 may include a processor 302, software components 304, memory 306, audio processing components 308, audio amplifier(s) 310, speaker(s) 312, and a network interface 314 including wireless interface(s) 316 and wired interface(s) 318. In one case, the playback device 300 may not include the speaker(s) 312, but rather a speaker interface for connecting the playback device 300 to external speakers. In another case, the playback device 300 may include neither the speaker(s) 312 nor the audio amplifier(s) 310, but rather an audio interface for connecting the playback device 300 to an external audio amplifier or audio-visual receiver.

In one example, the processor 302 may be a clock-driven computing component configured to process input data according to instructions stored in the memory 306. The memory 306 may be a tangible computer-readable medium configured to store instructions executable by the processor 302. For instance, the memory 306 may be data storage that can be loaded with one or more of the software components 304 executable by the processor 302 to achieve certain functions. In one example, the functions may involve the playback device 300 retrieving audio data from an audio source or another playback device. In another example, the functions may involve the playback device 300 sending audio data to another device or playback device on a network. In yet another example, the functions may involve pairing of the playback device 300 with one or more playback devices to create a multi-channel audio environment.

Certain functions may involve the playback device 300 synchronizing playback of audio content with one or more other playback devices. During synchronous playback, a listener will preferably not be able to perceive time-delay differences between playback of the audio content by the playback device 300 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 306 may further be configured to store data associated with the playback device 300, such as one or more zones and/or zone groups the playback device 300 is a part of, audio sources accessible by the playback device 300, or a playback queue that the playback device 300 (or some other playback device) may be associated with. The data may be stored as one or more state variables that are periodically updated and used to describe the state of the playback device 300. The memory 306 may also include the data associated with the state of the other devices of the media system, and shared from time to time among the devices so that one or more of the devices have the most recent data associated with the system. Other embodiments are also possible.

The audio processing components 308 may include one or more digital-to-analog converters (DAC), an audio preprocessing component, an audio enhancement component or a digital signal processor (DSP), and so on. In one embodiment, one or more of the audio processing components 308 may be a subcomponent of the processor 302. In one example, audio content may be processed and/or intentionally altered by the audio processing components 308 to produce audio signals. The produced audio signals may then be provided to the audio amplifier(s) 310 for amplification and playback through speaker(s) 312. Particularly, the audio amplifier(s) 310 may include devices configured to amplify audio signals to a level for driving one or more of the speakers 312. The speaker(s) 312 may include an individual transducer (e.g., a "driver") or a complete speaker system involving an enclosure with one or more drivers. A particular driver of the speaker(s) 312 may include, for example, a subwoofer (e.g., for low frequencies), a mid-range driver (e.g., for middle frequencies), and/or a tweeter (e.g., for high frequencies). In some cases, each transducer in the one or more speakers 312 may be driven by an individual corresponding audio amplifier of the audio amplifier(s) 310. In addition to producing analog signals for playback by the playback device 300, the audio processing components 308 may be configured to process audio content to be sent to one or more other playback devices for playback.

Audio content to be processed and/or played back by the playback device 300 may be received from an external source, such as via an audio line-in input connection (e.g., an auto-detecting 3.5 mm audio line-in connection) or the network interface 314.

The network interface 314 may be configured to facilitate a data flow between the playback device 300 and one or more other devices on a data network. As such, the playback device 300 may be configured to receive audio content over the data network from one or more other playback devices in communication with the playback device 300, network devices within a local area network, or audio content sources over a wide area network such as the Internet. In one example, the audio content and other signals transmitted and received by the playback device 300 may be transmitted in the form of digital packet data containing an Internet Protocol (IP)-based source address and IP-based destination addresses. In such a case, the network interface 314 may be configured to parse the digital packet data such that the data destined for the playback device 300 is properly received and processed by the playback device 300.

As shown, the network interface 314 may include wireless interface(s) 316 and wired interface(s) 318. The wireless interface(s) 316 may provide network interface functions for the playback device 300 to wirelessly communicate with other devices (e.g., other playback device(s), speaker(s), receiver(s), network device(s), control device(s), controller device(s) within a data network the playback device 300 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 318 may provide network interface functions for the playback device 300 to communicate over a wired connection with other devices in accordance with a communication protocol (e.g., IEEE 802.3). While the network interface 314 shown in FIG. 3 includes both wireless interface(s) 316 and wired interface(s) 318, the network interface 314 may in some embodiments include only wireless interface(s) or only wired interface(s).

In one example, the playback device 300 and one other playback device may be paired to play two separate audio components of audio content. For instance, playback device 300 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 300 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 300 is a playback device designed to render low frequency range audio content (i.e. a subwoofer), the playback device 300 may be consolidated with a playback device designed to render full frequency range audio content. In such a case, the full frequency range playback device, when consolidated with the low frequency playback device 300, may be configured to render only the mid and high frequency components of audio content, while the low frequency range playback device 300 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 3 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 200 of FIG. 2, the environment may have one or more playback zones, each with one or more playback devices. The media playback system 200 may be established with one or more playback zones, after which one or more zones may be added, or removed to arrive at the example configuration shown in FIG. 2. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 2, the balcony, dining room, kitchen, bathroom, office, and bedroom zones each have one playback device, while the living room and master bedroom zones each have multiple playback devices. In the living room zone, playback devices 204, 206, 208, and 210 may be configured to play audio content in synchrony as individual playback devices, as one or more bonded playback devices, as one or more consolidated playback devices, or any combination thereof. Similarly, in the case of the master bedroom, playback devices 222 and 224 may be configured to play audio content in synchrony as individual playback devices, as a bonded playback device, or as a consolidated playback device.

In one example, one or more playback zones in the environment of FIG. 2 may each be playing different audio content. For instance, the user may be grilling in the balcony zone and listening to hip hop music being played by the playback device 202 while another user may be preparing food in the kitchen zone and listening to classical music being played by the playback device 214. In another example, a playback zone may play the same audio content in synchrony with another playback zone. For instance, the user may be in the office zone where the playback device 218 is playing the same rock music that is being playing by playback device 202 in the balcony zone. In such a case, playback devices 202 and 218 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 200 may be dynamically modified, and in some embodiments, the media playback system 100 supports numerous configurations. For instance, if a user physically moves one or more playback devices to or from a zone, the media playback system 200 may be reconfigured to accommodate the change(s). For instance, if the user physically moves the playback device 202 from the balcony zone to the office zone, the office zone may now include both the playback device 218 and the playback device 202. The playback device 202 may be paired or grouped with the office zone and/or renamed if so desired via a control device such as the control devices 226 and 228. On the other hand, if the one or more playback devices are moved to a particular area in the home environment that is not already a playback zone, a new playback zone may be created for the particular area.

Further, different playback zones of the media playback system 200 may be dynamically combined into zone groups or split up into individual playback zones. For instance, the dining room zone and the kitchen zone 214 may be combined into a zone group for a dinner party such that playback devices 212 and 214 may render audio content in synchrony. On the other hand, the living room zone may be split into a television zone including playback device 204, and a listening zone including playback devices 206, 208, and 210, if the user wishes to listen to music in the living room space while another user wishes to watch television.

c. Example Control Devices

Figure 4:
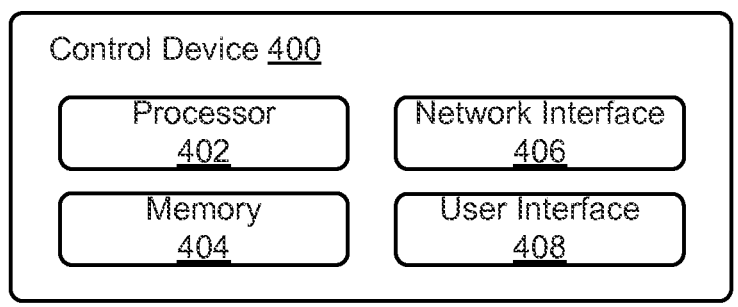
FIG. 4 shows a functional block diagram of an example control device.

FIG. 4 shows a functional block diagram of an example control device 400 that may be configured to be one or both of the control devices 226 and 228 of the media playback system 200. As shown, the control device 400 may include a processor 402, memory 404, a network interface 406, and a user interface 408. In one example, the control device 400 may be a dedicated controller for the media playback system 200.

In another example, the control device 400 may be a network device on which media application software is installed, such as an iPhone™, iPad™ or any other smart phone, tablet or network device (e.g., a networked computer such as a PC or Mac™). In examples, the media application may take the form of a media playback system controller application operable to control a media playback system. In yet another example, the media application may be operable to cause the control device 400 to obtain media (e.g., from a given media service provider associated with the media application) independent from a media playback system and may also be operable as a control device of a media playback system.

The processor 402 may be configured to perform functions relevant to facilitating user access, control, and configuration of the media playback system 200. The memory 404 may be configured to store instructions executable by the processor 402 to perform those functions. The memory 404 may also be configured to store the media playback system controller application software and other data associated with the media playback system 200 and the user.

In one example, the network interface 406 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 406 may provide a means for the control device 400 to communicate with other devices in the media playback system 200. In one example, data and information (e.g., such as a state variable) may be communicated between control device 400 and other devices via the network interface 406. For instance, playback zone and zone group configurations in the media playback system 200 may be received by the control device 400 from a playback device or another network device, or transmitted by the control device 400 to another playback device or network device via the network interface 406. In some cases, the other network device may be another control device.

Playback device control commands such as volume control and audio playback control may also be communicated from the control device 400 to a playback device via the network interface 406. As suggested above, changes to configurations of the media playback system 200 may also be performed by a user using the control device 400. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 400 may sometimes be referred to as a controller, whether the control device 400 is a dedicated controller or a network device on which media playback system controller application software is installed.

Figure 5:
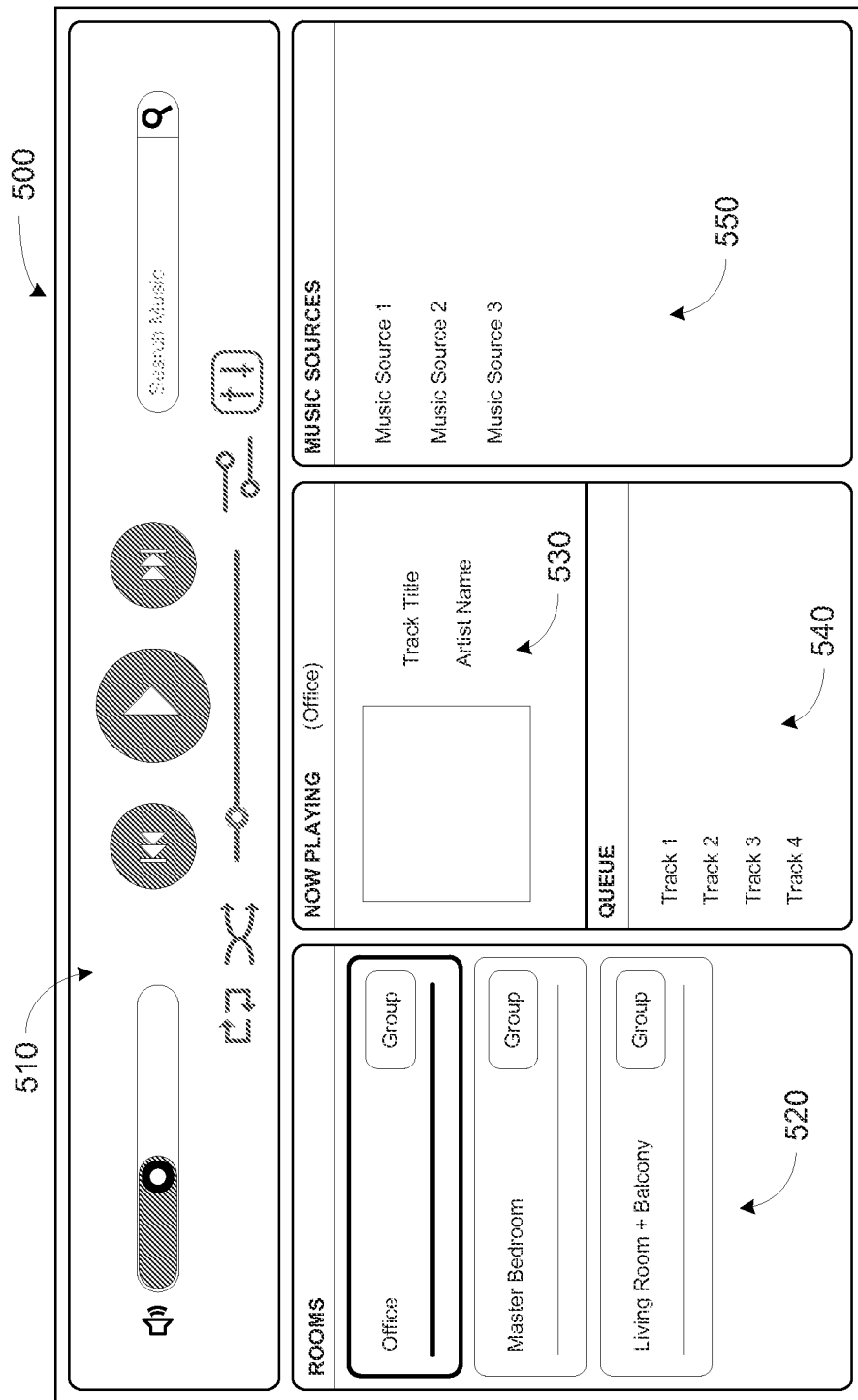
FIG. 5 shows an example controller interface.

The user interface 408 of the control device 400 may be configured to facilitate user access and control of the media playback system 200, by providing a controller interface such as the controller interface 500 shown in FIG. 5. The controller interface 500 includes a playback control region 510, a playback zone region 520, a playback status region 530, a playback queue region 540, and an audio content sources region 550. The user interface 500 as shown is just one example of a user interface that may be provided on a network device such as the control device 400 of FIG. 4 (and/or the control devices 226 and 228 of FIG. 2) and accessed by users to control a media playback system such as the media playback system 200. Other user interfaces of varying formats, styles, and interactive sequences may alternatively be implemented on one or more network devices to provide comparable control access to a media playback system.

The playback control region 510 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 510 may also include selectable icons to modify equalization settings, and playback volume, among other possibilities.

The playback zone region 520 may include representations of playback zones within the media playback system 200. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 500 are also possible. The representations of playback zones in the playback zone region 520 may be dynamically updated as playback zone or zone group configurations are modified.

The playback status region 530 may include graphical representations of audio content that is presently being played, previously played, or scheduled to play next in the selected playback zone or zone group. The selected playback zone or zone group may be visually distinguished on the user interface, such as within the playback zone region 520 and/or the playback status region 530. The graphical representations may include track title, artist name, album name, album year, track length, and other relevant information that may be useful for the user to know when controlling the media playback system via the user interface 500.

The playback queue region 540 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 500 of FIG. 5, the graphical representations of audio content in the playback queue region 540 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 550 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 200 of FIG. 2, local music libraries on one or more network devices (such as a control device, a network-enabled personal computer, or a networked-attached storage (NAS), for example), streaming audio services providing audio content via the Internet (e.g., the media service servers 135-145), or audio sources connected to the media playback system via a line-in input connection on a playback device or network devise, among other possibilities.

In some embodiments, audio content sources may be regularly added or removed from a media playback system such as the media playback system 200 of FIG. 2. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

IV. Social Media Queues

As discussed above, examples provided herein are directed to social-media playback queues. Operations related to social-media playback queues may be discussed herein with respect to a particular system or device. This however is for purposes of example and explanation only and should not be construed as limiting. Other systems and/or devices may perform all or part of the operations without departing from the scope of the present examples.

A social-media computing system may be configured to receive an identifier of a media playback system. In examples, the social-media computing system may include the social-media server 130 of FIG. 1. In general, the social-media computing system may include a single computing device or multiple networked computing devices configured to perform the operations of the social-media server 130 described herein.

The identifier of a media playback system, such as the media playback system 140, may be any identifier that is operable to uniquely identify a particular media playback system. That is, the identifier may help to differentiate a particular media playback system from other media playback systems. In examples, the identifier may take the form of a household identifier (HHID) that may include a string of alphanumeric characters. The identifier may be computer-generated to ensure that it is indeed unique.

In practice, the social-media server 130 may receive the identifier from a number of network elements. In some examples, a media playback system, such as the media playback system 140, may be configured to provide the identifier to the social-media server 130. The media playback system 140 may be configured to do so when a particular event occurs at the media playback system 140.

For instance, before the media playback system 140 is operable, the media playback system 140 may be configured to perform one or more setup procedures. One such procedure may provide a number of prompts via a control device of the media playback system 140 to a user. The prompts may request that the user provide certain account information, such as credentials (e.g., login name and password), for a particular social-media service. The media playback system 140 may be configured to receive data indicating credentials associated with a social-media account, and based on the received credentials, the media playback system 140 may be configured to transmit the identifier to the social-media server 130.

Additionally or alternatively, the media playback system 140 may be operable to provide the identifier independent from any setup procedures. For example, the control device of the media playback system 140 may be configured to receive data indicating login credentials for a particular social-media service at any point in time after the media playback system 140 is setup. In this way, a user may provide his or her social-media account login credentials sometime after originally setting up the media playback system 140.

In other instances, after the media playback system 140 receives login credentials, the media playback system 140 may be configured to pass the credentials or an indication that credentials were received to the media system server 120. The media system server 120 may be configured to identify the identifier of the media playback system 140 and provide the identifier to the social-media server 130.

In some instances, the media playback system 140 may be configured to automatically provide the identifier of the media playback system 140 to the social-media server 130. In particular, a playback or control device may determine that a social-media application is installed on another computing device of the media playback system 140 (e.g., the control device or perhaps the computing device 150 with an installed media application that is operable to control the media playback system). Based on this determination, the playback or control device may transmit the identifier of the media playback system 140 to the social-media server 130.

In other examples, a computing device, such as the computing device 150, may be configured to provide the identifier to the social-media server 130. For instance, the computing device 150 may be configured to provide the identifier when the computing device 150 first attempts to access the social-media network hosted by the social-media server 130.

For example, the computing device 150 may be configured to run a web browser or a social-media application to access the social-media network, and when the computing device 150 first attempts to access the social-media network, the social-media server 130 may be configured to cause the computing device 150 to perform one or more account initiation procedures. Such procedures may require a subscriber to create a login name and password (e.g., login credentials) and to also provide certain background information, which may include whether the subscriber has a particular type of media playback system and/or a playback system account. The computing device 150 may be configured to receive data indicating responses to these initiation procedures.

In the event the computing device 150 receives data indicating that the subscriber has a particular type of media playback system, the computing device 150 may be configured to obtain the identifier of the media playback system 140 or facilitate obtaining the identifier. For example, the computing device 150 may be configured to determine whether a media application used to control the media playback system 140 is installed on the computing device 150. If so, the computing device 150 may obtain the identifier from the media application and provide the identifier to the social-media server 130. In other examples, the computing device 150 may receive data indicating playback system account information that is linked with the media playback system 140. For example, the subscriber may enter, during the initiation procedures, login credentials to a playback system account that was previously created when the media playback system 140 was first setup. The computing device 150 may be configured to pass these login credentials to the social-media server 130, and then the social-media server 130 may be configured to communicate with the media system server 120 to obtain the identifier of the media playback system 140.

Additionally or alternatively, the computing device 150 may be operable to provide the identifier independent from any initiation procedures. For example, the computing device 150 (e.g., via a web browser or social-media application) may be configured to receive the above-discussed data at any point in time after the account initiation procedures are completed. In this way, a subscriber may facilitate linking the media playback system 140 to the subscriber's social-media account some point in time after originally creating the social-media account (e.g., perhaps the subscriber purchased the media playback system 140 years after creating the social-media account).

In yet other examples, the computing device 150 may be configured to automatically provide the identifier of the media playback system 140 to the social-media server 130. In particular, when the computing device 150 first installs a media application operable to control the media playback system 140, the computing device 150 may provide the identifier if the computing device 150 detects that a social-media application is also installed on the computing device 150. Similarly, when the computing device 150 first installs a social-media application, the computing device 150 may provide the identifier if the computing device 150 detects that a media application is also installed on the computing device 150 that is operable to control the media playback system 140.

After the social-media server 130 receives the identifier of the media playback system 140, the social-media server 130 may link the identifier with a social-media account. In particular, the social-media server 130 may be configured to store in memory an association between the identifier and the social-media account.

In examples, when the social-media server 130 receives the identifier, the social-media server 130 may also receive an indication of a social-media account to which the identifier of the media playback system 140 should be linked to. In other examples, the social-media server 130 may determine the social-media account to which the identifier should be linked to. For instance, in a scenario where the social-media server 130 received the identifier during initiation procedures, the social-media server 130 may determine that the appropriate social-media account is the newly created social-media account. Other examples are also possible.

In any event, after the social-media server 130 links the identifier of the media playback system 140 with the social-media account, the media playback system 140 is then linked to the social-media account. In this way, the media playback system 140 is associated with the social-media account and may be controlled by certain social-media activities, as discussed in further detail below.

Based at least on linking the identifier with the social-media account, the social-media server 130 may be configured to generate a social-media playback queue that is associated with the social-media account. The social-media playback queue may be fillable with media items that are playable by the media playback system 140. In examples, the media items may take the form of audio, video, and/or audiovisual media items and/or any media described herein. In some examples, a playlist of several media items or individual media items may be added to a social-media playback queue.

A social-media playback queue may have a playback order that a media playback system may follow when playing back the social-media playback. In examples discussed below that involve adding a media item to a social-media playback queue, added media items may be placed at the bottom or top of the social-media playback queue. In some such examples, added media items may be placed in positions between the top and bottom of the queue. The position may be determined randomly, passed on default settings, or perhaps based on user inputs. Other examples are also possible.

After the social-media server 130 generates a social-media playback queue the social-media playback queue may then be stored in such a manner that social-media subscribers utilizing computing devices and/or media playback systems may access the queue. In some examples, the social-media server 130 may be configured to store social-media playback queues. In other examples, the media system server 120 may be configured to store social-media playback queues. Other examples are also possible.

Figure 6A:
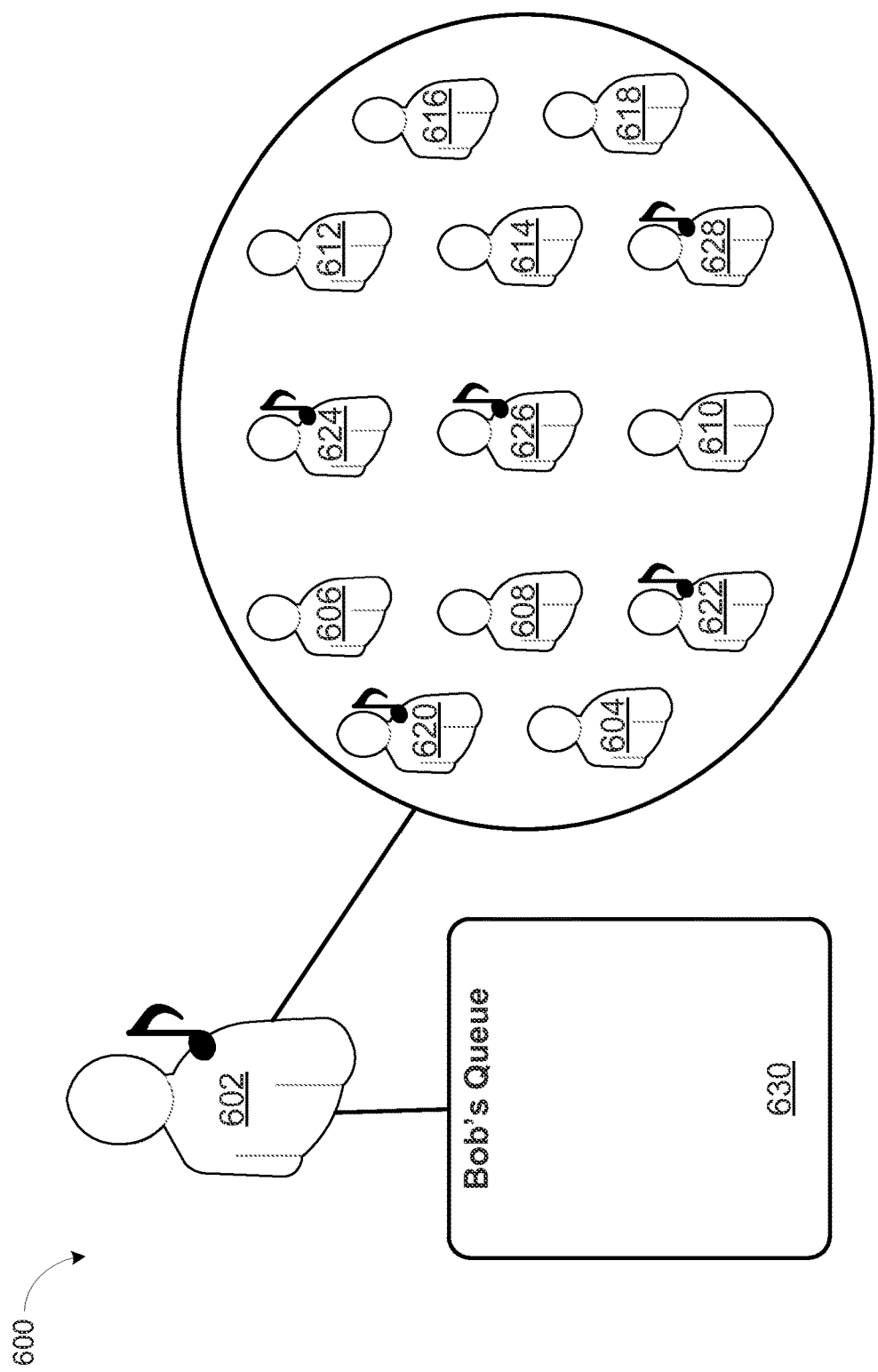
FIG. 6A is a conceptual illustration of a social-media account.

To illustrate, FIG. 6A is a conceptual illustration of a social-media account 600. In particular, the illustration depicts the social-media account 600 after the social-media server 130 links the media playback system 140 to the social-media account 600 and generates a social-media playback queue 630. As shown, the social-media account 600 of subscriber 602 ("Bob") is part of a social-media network that includes social-media accounts of subscribers 604-628. The subscribers 604-628 may be Bob's social-media "friends." As shown, some of Bob's "friends" have social-media accounts linked to respective media playback systems, as indicated by the musical note (e.g., subscribers 620-628). Moreover, the social-media playback queue 630 ("Bob's Queue") is shown as currently being empty.

After the social-media server 130 generates the social-media playback queue 630, Bob 602 may access the social-media playback queue 630. For example, Bob 602 may access the queue 630 by using his social-media login credentials to access the social media network and his social-media profile. Once Bob 602 accesses the queue 630, Bob 602 may add media items to the queue 630, remove media items, modify a playback order, and the like. Further, Bob 602 may cause the social-media playback queue 630 to be played back (e.g., through a web browser on the computing device 150 or by the media playback system 140, among other possibilities).

In practice, Bob 602 may utilize the computing device 150 (and/or other computing devices) to access the social-media playback queue 630 (e.g., via a web browser or a social-media application installed on the computing device 150). Additionally or alternatively, Bob 602 may utilize the media playback system 140 (e.g., a control device of the media playback system 140) to access the social-media playback queue 630.

Moreover, other social-media subscribers may also access the social-media playback queue 630. In examples, after the social-media playback queue 630 is generated, the social-media server 130 may be configured to establish access permissions to the social-media playback queue 630. Access permissions may designate other subscribers that may access the social-media playback queue 630, such as "friends" of Bob 602. Further, the access permissions may define what actions other subscribers may perform with the social-media playback queue 630.

In practice, the social-media server 130 may be configured to implement "default" access permissions unless other access permissions are provided. For example, the social-media server 130 may be configured to establish, by default, that all social-media subscribers (e.g., even social-media subscribers outside of Bob's social network) may view the social-media playback queue 630, that "friends" of Bob 602 (e.g., subscribers 604-628) may contribute to the queue 630, and that "friends" that also have a linked media playback system (e.g., subscribers 620-628) may play back the queue 630 at their respective linked playback systems. Other "default" access permissions are also possible.

In other cases, the social-media server 130 may be configured to receive access permission settings and may then establish the access permissions based on the received access permissions settings. A computing device (e.g., the computing device 150) or a media playback system (e.g., a controller of the media playback system 140) may be configured to provide the access permissions settings to the social-media server 130, which may occur in response to receiving data indicating Bob's preferences regarding access permissions.

After the social-media server 130 establishes the access permissions, the social-media server 130 may be configured to apply the established access permissions to the social-media accounts of those subscribers with access to the social-media playback queue 630. Those subscribers with the appropriate access permissions may then access the social-media playback queue 630 using a computing device and/or media playback system (e.g., a control device of a media playback system). In particular, the social-media server 130 may provide to the computing device or media playback system the social-media playback queue 630. In some examples, the computing device or media playback system may then display a visual representation of the social-media playback queue 630, play back the queue 630, and/or facilitate contributing to the queue 630. In a particular example, other subscribers with the appropriate access permissions may view a representation of the social-media playback queue 630 via the social network. For instance, the other subscribers may view the social-media playback queue 630 through Bob's social-media profile, wall, or the like.

In some examples, one of the other subscribers may have a linked media playback system as well. For instance, Bob's friend Jane 622 may have the media playback system 142 at her home and the media playback system 142 may be linked to her social-media account. After the social-media server 130 established the access permissions, the social-media server 130 may be configured to provide the media playback system 142 (e.g., a playback device of the media playback system 142) an indication of Bob's queue 630. In some cases, the media playback system 142 may have requested Bob's queue 630 based on a control device of the media playback system 142 receiving data indicating instructions to view Bob's queue 630.

In examples, the indication may be of all of the media items in Bob's queue 630, while in other examples the indication may be of a portion of those media items. Moreover, in some examples, the indication may provide a textual representation of Bob's queue 630 (e.g., a listing of those media items contained within Bob's queue 630). In other examples, the indication may provide a pointer or other network location identifier that is operable to locate the data storage space that stores Bob's queue 630. In yet other examples, the indication may provide respective pointers or the like for some or all of the media items contained within Bob's queue 630.

In any event, the media playback system 142 may receive the indication of the social-media playback queue 630 that corresponds to Bob's social-media account 600. In some examples, a playback device of the media playback system 142 may be configured to receive the indication and in turn, provide the indication to a control device of the media playback system 142. The control device may be configured to display Bob's queue 630 based on receiving the indication. The control device may display Bob's queue 630 by providing a visual representation of all or a portion of the media items currently contained in Bob's queue 630.

Moreover, the control device may be configured to receive playback data indicating an instruction for the media playback system 142 to playback Bob's queue 630. The control device may then provide a playback prompt to the playback device of the media playback system 142. The playback device may be configured to receive the playback prompt and then obtain one or more media items identified by Bob's queue 630 for play back by the playback device. In practice, the playback device may be configured to obtain from the social-media server 130 a pointer or other network location identifier to the one or more media items. In some examples, the social-media server 130 may be configured to instruct the media system server 120 to provide the playback device the media items or pointers to the one or more media items.

In examples, a media playback system (e.g., either or both of the media playback systems 140 and 142) may be configured to assign a zone or zone group to the social-media playback queue 630. That is, a portion of the playback devices of a media playback system may be assigned to play back the media contained in the social-media playback queue 630, while another portion of media playback system may be assigned to play back other media. In some examples, a media playback system may include multiple zones or zone groups, each of which may be assigned to different social-media playback queues. Other examples are also possible.

Moreover, in some examples, media items in a social-media playback queue may be identified by a unique identifier, such as a universal track identifier (UTID). In such examples, a media playback system may be configured to translate the UTID, perhaps utilizing a cross-service linking database or the like, to an identifier of a media service supported by the particular media playback system. In this way, the social-media server 130 may be configured to provide social-media playback queues in a manner such that any media playback system may access the media, regardless of the particular media services supported by the media playback system. Other examples are also possible.

In some cases, Jane 622 may use her computing device 152 or the control device of the media playback system 142 to add a media item to Bob's queue 630. For example, Jane 622 may access the social network via the computing device 152 and may be perusing Bob's social-media profile. The social-media profile may provide a visualization of Bob's queue 630. For example, Bob's wall or the like may include a visual representation of Bob's queue 630. Jane 622 may then add a media item to Bob's queue 630 through Bob's wall or the like.

In particular, a computing device affiliated with Jane's 622 social-media account (e.g., the computing device 152 or the control device of the media playback system 142 that was previously linked to Jane's social-media account) may be configured to receive media selection data indicating a media item to be added to Bob's social-media playback queue 630. In turn, the computing device may be configured to transmit to the social-media server 130 an indication of the media item. The social-media server 130 may then add the media item to Bob's queue 630.

Figure 6B:
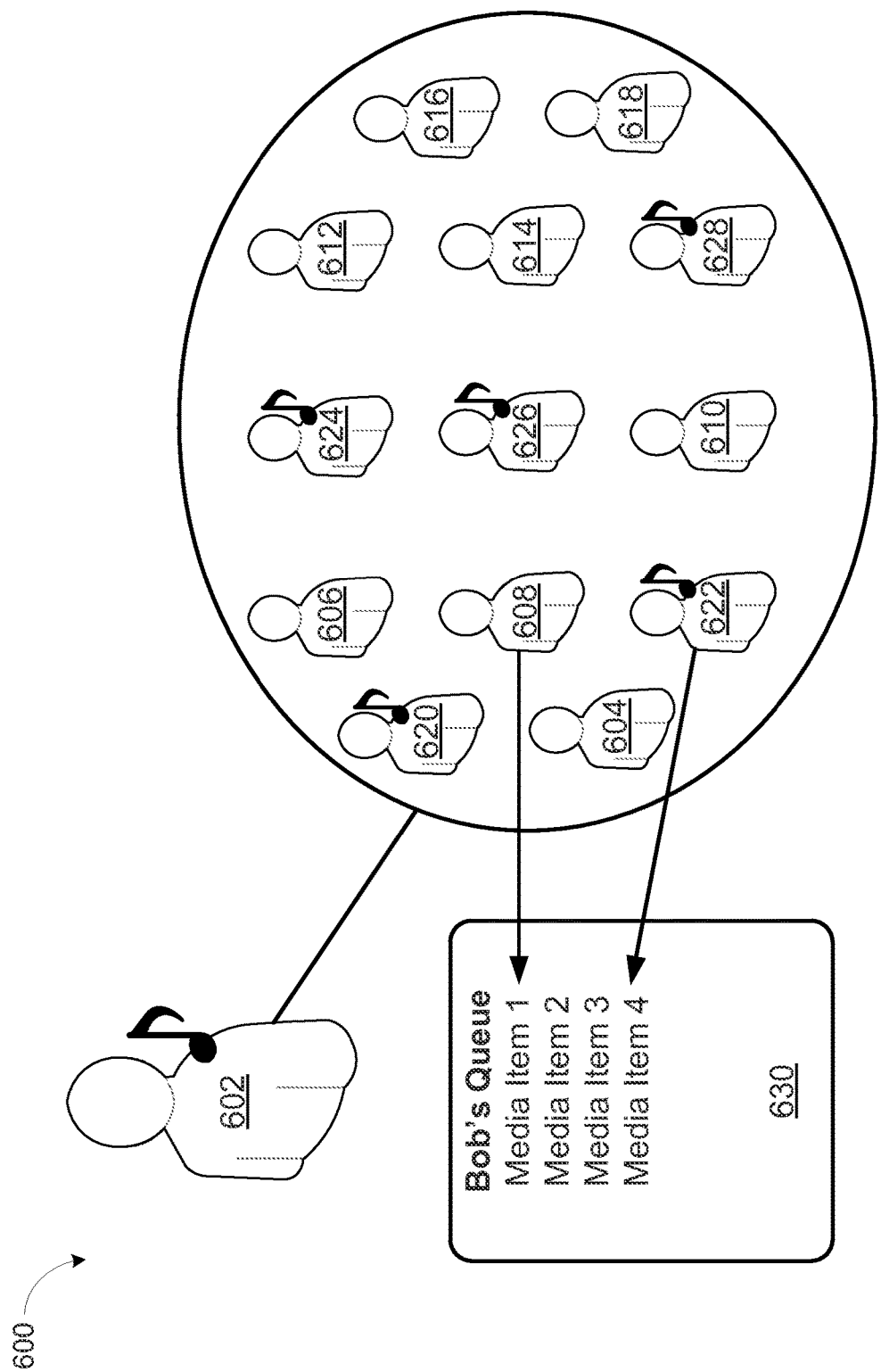
FIG. 6B is a conceptual illustration of a social-media playback queue populated with media items.

To illustrate, FIG. 6B is a conceptual illustration of a social-media playback queue populated with media items. In particular, FIG. 6B is the social-media account 600 from FIG. 6A but with the social-media playback queue 630 populated with media items. As shown, Bob's queue 630 now includes Media Items 1-4. In this example, Media Item 1 was added by John 608 who does not have a media playback system linked to his social-media account, possibly using a desktop computer accessing the social-media network via a web browser. Media Items 2-3 were added by Bob 602, possibly using the control device of the media playback system 140 and/or the computing device 150. Media Item 4 was added by Jane 622 in line with the above discussion.

This update to Bob's queue 630 may be viewable and otherwise accessible to other subscribers with appropriate access permissions, perhaps in real-time. Indeed, multiple subscribers may access Bob's queue 630 and play back the added media items at the same time, perhaps in synchrony. A given subscriber may play back Bob's queue 630 through a web browser or social-media application on a computing device or through a linked media playback system, provided the given subscriber has a linked playback system, among other examples.

In some cases, the contributions by a social-media "friend" to a social-media playback queue may be removed based on that social-media "friend" being "de-friended". For example, at some point in time, Bob 602 may determine that he no longer likes John 608 (perhaps because John 608 has bad musical taste), and Bob 602 may "de-friend" John 608. In practice, Bob 602 may do so by, for example, inputting a "de-friend" selection into the computing device 150. The computing device 150 may be configured to transmit data indicating an instruction remove the social-media account of John 608 from Bob's group of social-media "friends." Based on receiving such an instruction, the social-media server 130 may be configured to remove the "friend" association between John's and Bob's social-media accounts, modify access permissions such that John's social-media account no longer has access to Bob's queue, and/or remove from Bob's queue 630 any media items that John 608 added, such as Media Item 4. Other examples are also possible.

In examples, a media playback system (e.g., a playback device of a media playback system) or computing device with access permissions to at least view a social-media playback queue may be configured to generate a playlist based on the social-media playback queue. For example, a playback device of the media playback system 140 may be configured to generate a playlist based on whatever media items are currently contained within Bob's queue 630. Then, at some other point in time, the playback device may be configured to generate another playlist based on whatever media items are then contained within Bob's queue 630. The second playlist may be different from the first playlist in the event that media items from Bob's queue 630 had been added, removed, or reordered after the first playlist was generated. One or both of these playlists may be stored by the playback device in memory.

The social-media server 130 may be configured to generate, store, and update more than one social-media playback queue for any given social-media account. That is, any given social-media subscriber may have multiple social-media playback queues.

In some examples, a social-media playback queue may be generated when a social-media event is created by a subscriber with a linked media playback system. That is, the social-media server 130 may be configured to generate a social-media playback queue based at least on receiving an indication of a social-media event corresponding to a social-media account. Queues that are generated in this way may be referred herein as "social-media-event playback queues." Such queues are similar to the social-media playback queues described above; however, social-media-event playback queues are linked with a particular social-media event. In some examples, the social-media server 130 may automatically generate such a queue, or in other examples, the social-media server 130 may generate such a queue based on receiving data indicating an affirmative decision to have the queue generated.

A social-media event may correspond to a real-world event that occurs at a particular time and place (e.g., a real-world location with identifiable GPS coordinates) where a particular media playback system will play back media. Examples of a social-media event may include birthday parties, weddings, graduation celebrations, and other occasions. Indeed, social-media events may be the similar in many respects to traditional social events but invitations to the social-media event are distributed via a social-media network, among other differences.

Access permissions to a social-media-event playback queue may be limited to those "friends" that the subscriber invites to the social-media event. In such examples, invited "friends" may add media items to the social-media playback queue prior to the event, or even during the event, and the social-media server 130 may be configured to track which media items a particular "friend" adds.

To illustrate, FIG. 6C is a conceptual illustration of a social-media-event playback queue. In particular, the illustration depicts the social-media account 600 after the social-media server 130 generates a social-media-event playback queue 632. Here, Bob 602 may have created a social-media event to celebrate his birthday using a social-media application on his computing device 150. Bob 602 may have invited a subset of his social-media "friends" (e.g., the subscribers 610, 614, 626, and 628) to join in the celebration. After receiving event-detail information from the computing device 150, the social-media server 130 may have created the social-media event (e.g., generate an "event page" that may include an "event wall) and then generated the social-media-event playback queue 632. Moreover, the social-media server 130 may have established and applied access permission for the queue 632 such that only those subscribers invited to the social-media event may access the queue 632. Other examples are also possible.

After receiving an indication of the social-media event (e.g., to celebrate Bob's birthday), the social-media server 130 may be configured to provide an indication of the social-media event to those subscribers invited by Bob 602. In examples, this indication may take the form of an invitation that may be provided to the invited subscriber via email, text message, social-media message, or the like. Moreover, the invitation may provide an indication or perhaps a link to Bob's birthday queue 632.

In line with the above discussion, the invited subscribers 610, 614, 626, and 628 may use a computing device or control device of a media playback system to access and contribute to the social-media-event playback queue 632. As shown in FIG. 6C, the subscribers 610, 614, and 626 added respective media items to Bob's birthday queue 632. The social-media server 130 may be configured to track which subscriber added each track to the social-media-event playback queue 632. In examples, the social-media server 130 may perform this operation by storing in memory a subscriber indicator or the like along with each added media item.

After an invited subscriber indicates that he or she plans to attend the social-media event, the social-media server 130 may be configured to provide an indication of Bob's birthday queue 632 along with the invited subscriber's social-media account. For example, an indication of the queue 632 may be provided on the wall or timeline of the invited subscriber for others subscribers to view.

Additionally, when an invited subscriber contributes to Bob's birthday queue 632, the social-media server 130 may be configured to provide an indication of the contribution. For example, after the subscriber 614 ("Kate") added Media Item 3 to Bob's birthday queue 632, an indication may be displayed on Kate's timeline indicating "Kate added Media Item 3 to Bob's Birthday Queue!" or the like.

At the social-media event, the media playback system 140 may be configured to access and play back the social-media-event playback queue 632. In particular, the media playback system 140 may be configured to obtain from the social-media server 130 the media items or links to the media items contained in Bob's birthday queue 632. In some examples, the media system server 120 may be configured to facilitate the media playback system 140 obtaining the media items.

In some examples, the media playback system 140 may be configured to, before playing back a given media item from the social-media-event playback queue 632, enable the given media item for play back. Enabling a media item for play back may be performed in a number of manners.

In one example, the media playback system 140 may be configured to receive an enable message indicating one or more media items to enable for play back, and based on the received enable message, enable the indicated media items for play back. In particular, when a "friend" arrives at the social-media event (e.g., Bob's birthday party located at a particular geographic location), the "friend" may use his or her computing device to "check in" to the social-event using a social-media application installed on the computing device. For instance, the "friend" may access the social-media wall for the social-media event and "check in" indicating that the "friend" is at the event.

In practice, the computing device may be configured to transmit to the social-media server 130 an indication that the computing device (and by implication, the particular subscriber) is located at the event location of the social-media event. In some examples, the indication may identify the particular social-media event that the subscriber is at or perhaps it may identify the geographic location (e.g., via GPS coordinates) of the computing device at the time the "check in" occurred. In any event, the social-media server 130 may be configured to receive the indication and determine which media items, if any, the particular subscriber added to the social-media-event playback queue 632.

The social-media server 130 may then provide to the media playback system 140 an enable message instructing the media playback system 140 to enable for play back the media items added by the particular subscriber. To illustrate, returning back to FIG. 6C, when a computing device linked to the subscriber 610 provides to the social-media server 130 an indication that the subscriber 610 is at Bob's birthday party, the social-media server 130 may facilitate enabling Media Item 6 for play back.

In some examples, the social-media server 130 and/or the media playback system 140 may be configured to modify the playback order of the social-media-event playback queue 632 based on an indication of a given subscriber arriving at the event. Modifying the playback order may involve moving, within the queue, one or more media items that the given subscriber added to the playback queue 632. In this way, the media playback system 140 may be configured to play a media item that the "friend" added to the social-media-event playback queue 632 relatively close to the time that the "friend" arrived and "checked in" to the social-media event.

For example, returning to FIG. 6C, after the media playback system 140 enables Media Item 6 for play back, the media playback system 140 may also move that media item up in the playback order. For example, if the media playback system 140 were playing Bob's birthday queue 632 in order as it appears in FIG. 6C and the current media item being played was Media Item 2, the media playback system 140 may move Media Item 6 to immediately follow Media Item 2. Other examples are also possible.

In some examples, the social-media server 130 may be configured to receive one or more "check-in" indications from respective computing devices or the like, and based on the received indications, the social-media server 130 may be configured to curate a playlist to be added to a social-media playback queue, such as Bob's birthday queue 632. In particular, after receiving "check-in" indications, the social-media server 130 may be configured to determine the subscribers that have "checked-in" to a given social-media event. The social-media server 130 may be configured to access the social-media accounts of the "checked-in" subscribers to analyze captured life events, musical preferences, favorite artists or albums, trending tastes, and the like of those subscribers to curate a playlist.

For example, the social-media server 130 may determine, based on the "checked-in" subscribers' social-media profiles, that the subscribers are all (or perhaps a predetermined threshold amount of) friends from high school from the 1990s. The social-media server 130 may then curate a 1990s based playlist. In another example, the social-media server 130 may determine that all (or a predetermined threshold amount of) the "checked-in" subscribers attended the same concert. The social-media server 130 may then curate a playlist based on that concert, perhaps using the set list from the concert. Other examples are also possible.

Thereafter, the social-media server 130 may be configured to add the curated playlist to social-media playback queue. The media playback system 140 may then play back the curated playlist.

One of ordinary skill in the art will appreciate that other social-media playback queues may be generated based on other social-media related activities and that the above-discussion of a social-media event is not meant to be limiting. Other examples are possible and contemplated herein.

Figure 7:
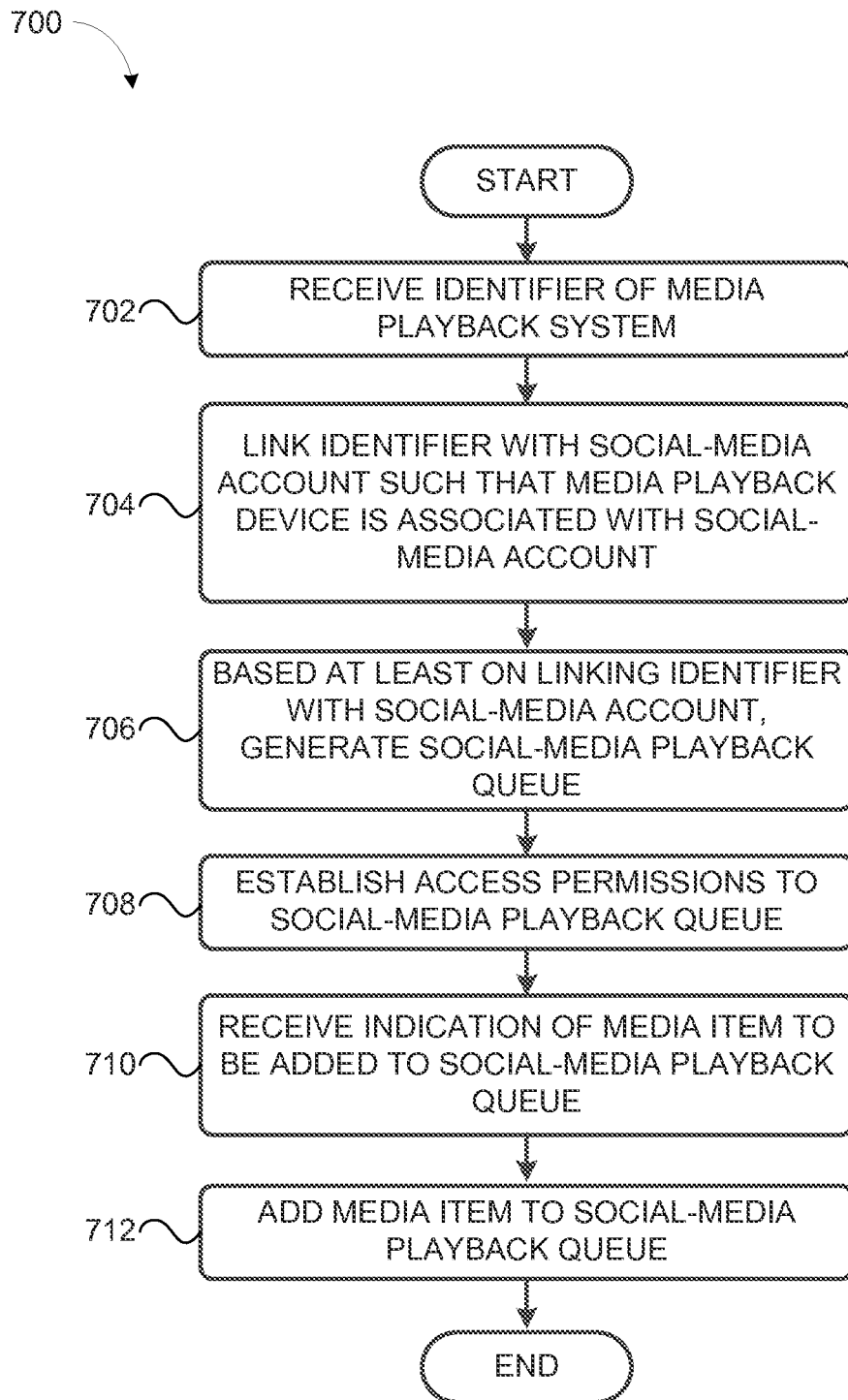
FIG. 7 shows a flow diagram of an example method.
Figure 8:
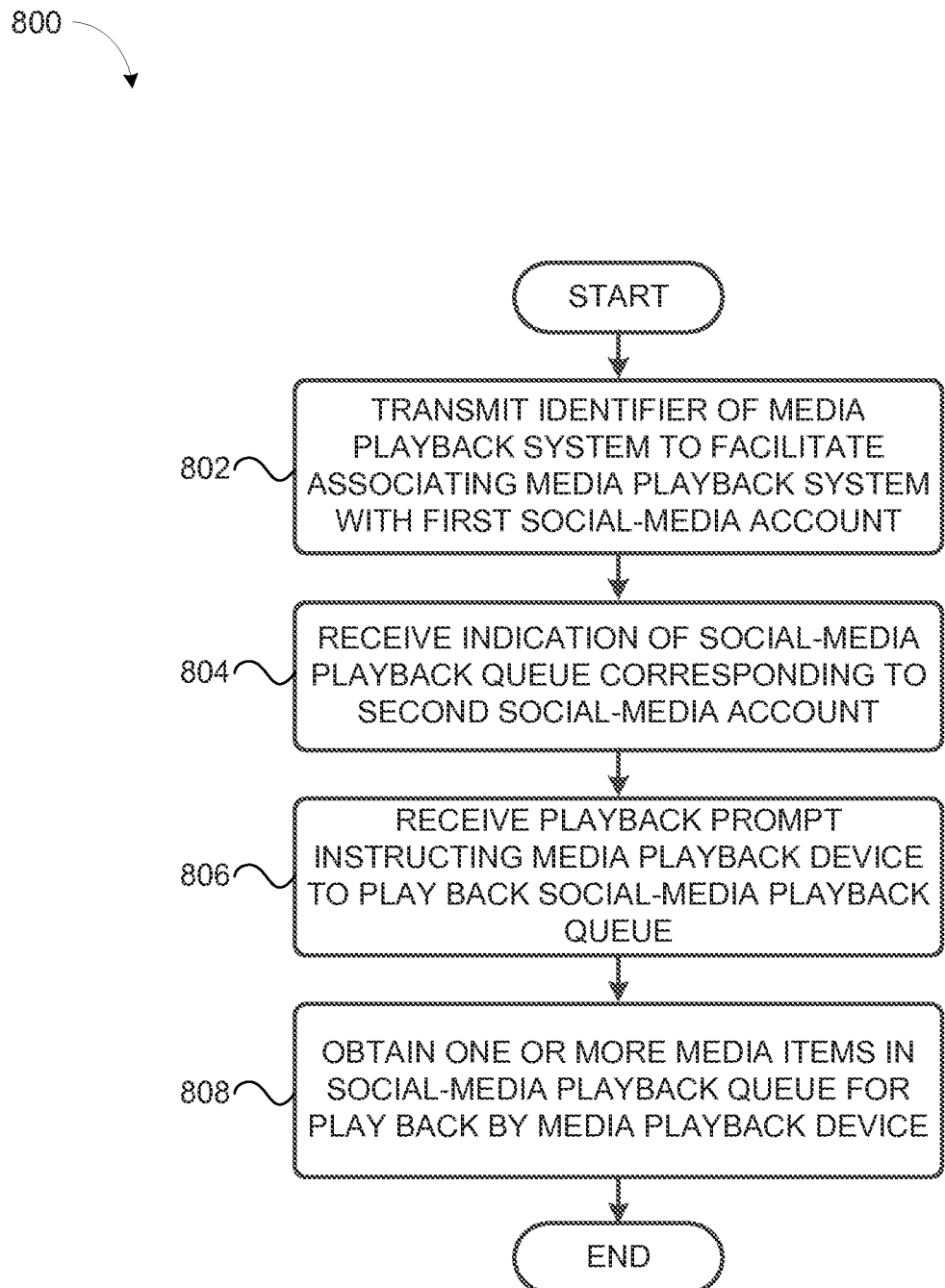
FIG. 8 shows a flow diagram of another example method.

For methods 700 and 800 of FIGS. 7 and 8, respectively, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the methods 700 and 800, and other processes and methods disclosed herein, each block in the respective figure may represent circuitry that is wired to perform the specific logical functions in the process.

Furthermore, although the blocks are illustrated in sequential order, these blocks may also be performed in parallel, and/or in a different order than those described herein. Also, the various blocks may be combined into fewer blocks, divided into additional blocks, and/or removed based upon the desired implementation.

For clarity, the methods may be described herein with reference to FIGS. 1 and 6A-6C. It should be understood, however, that this is for purposes of example and explanation only and that the operations of the methods should not be limited by these figures.

Method 700 shown in FIG. 7 presents an embodiment of a method that may be implemented within an operating environment (e.g., the network configuration 100 of FIG. 1) involving a computing system, such as the social-media server 130 of FIG. 1. In some implementations, an additional computing system (e.g., the media system server 120) in communication with the social-media server 130 may perform aspects of the method 700. The method 700 may include one or more operations, functions, or actions as illustrated by one or more of blocks 702-712. These operations, functions, or actions may be performed in line with the above discussion. Moreover, other of the operations, functions, or actions discussed above may be performed with or in addition to the method 700.

At block 702, the method 700 may involve the social-media server 130 receiving an identifier of a media playback system, such as the media playback system 140. At block 704, the method 700 may involve the social-media server 130 linking the identifier with a social-media account such that the media playback system 140 is associated with the social-media account. Then, at block 706, the method 700 may involve, based at least on linking the identifier with the social-media account, the social-media server 130 generating a social-media playback queue that is fillable with one or more media items that are playable by the media playback system 140. At block 708, the method 700 may involve the social-media server 130 establishing access permissions to the social-media playback queue, where the access permissions indicate at least one additional social-media account that is within a social-media network of the social-media account that has access to the social-media playback queue. At block 710, the method 700 may involve the social-media server 130 receiving, from a computing device affiliated with the at least one additional social-media account (e.g., the computing device 150), an indication of a media item to be added to the social-media playback queue. At block 712, the method 700 may also involve the social-media server 130 adding the media item to the social-media playback queue.

Method 800 shown in FIG. 8 presents an embodiment of a method that may be implemented within an operating environment (e.g., the network configuration 100 of FIG. 1) involving a computing system, such as the media playback system 142 of FIG. 1. In particular, the method 800 may be implemented by a computing device, such as a media playback device (e.g., the playback device 300 of FIG. 3) or media playback control device (e.g., the control device 400 of FIG. 4), of a media playback system. In some implementations, an additional computing device (e.g., a playback or control device) in communication with the computing device may perform aspects of the method 800. The method 800 may include one or more operations, functions, or actions as illustrated by one or more of blocks 802-808. These operations, functions, or actions may be performed in line with the above discussion. Moreover, other of the operations, functions, or actions discussed above may be performed with or in addition to the method 800.

At block 802, the method 800 may involve the playback device 300 (or a control device 400) transmitting, to a social-media computing system (e.g., the social-media server 130), an identifier of a media playback system (e.g., the media playback system 142 that includes the playback device 300 and/or control device 400) to facilitate associating the media playback system 142 with a first social-media account. At block 804, the method 800 may involve the playback device 300 receiving, from the social-media server 130, an indication of a social-media playback queue corresponding to a second social-media account, where the second social-media account is within a social-media network of the first social-media account. At block 806, the method 800 may involve the playback device 300 receiving a playback prompt (e.g., from the control device 400) instructing the playback device 300 to play back the social-media playback queue. Then, at block 808, the method 800 may involve the playback device 300 obtaining one or more media items in the social-media playback queue for play back by the playback device 300.

Other example methods are also contemplated herein. In particular, any combination of the above-discussed operations, functions, or actions may be performed consecutively in accordance with an example method.

While some examples described herein may refer to operations performed by given actors, such as "users", "subscribers", and/or other entities, it should be understood that this is for purposes of explanation only. The claims should not be interpreted to require action by any such actors unless explicitly required by the language of the claims themselves.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, examples provided herein are directed to social-media playback queues. In one aspect, a method is provided. The method involves (i) receiving, by a computing system, an identifier of a media playback system, (ii) linking the identifier with a social-media account such that the media playback system is associated with the social-media account, (iii) based at least on linking the identifier with the social-media account, generating a social-media playback queue that is fillable with one or more media items that are playable by the media playback system, (iv) establishing access permissions to the social-media playback queue, wherein the access permissions indicate at least one additional social-media account that (a) is within a social-media network of the social-media account and (b) has access to the social-media playback queue, (v) receiving, by the computing system from a computing device affiliated with the at least one additional social-media account, an indication of a media item to be added to the social-media playback queue, and (vi) adding the media item to the social-media playback queue.

In another aspect, a computing system is provided. The computing system comprises a network interface, a processing unit, a non-transitory computer-readable medium, and program instructions stored on the non-transitory computer-readable medium. The program instructions are executable by the processing unit and when executed cause the computing system to (i) receive an identifier of a media playback system, (ii) link the identifier with a social-media account such that the media playback system is associated with the social-media account, (iii) based at least on linking the identifier with the social-media account, generate a social-media playback queue that is fillable with one or more media items that are playable by the media playback system, (iv) establish access permissions to the social-media playback queue, wherein the access permissions indicate at least one additional social-media account that (a) is within a social-media network of the social-media account and (b) has access to the social-media playback queue, (v) receive, from a computing device affiliated with the at least one additional social-media account, an indication of a media item to be added to the social-media playback queue, and (vi) add the media item to the social-media playback queue.

In yet another aspect, a non-transitory computer-readable medium is provided. The non-transitory computer-readable medium having instructions stored thereon that are executable by a computing system to cause the computing system to (i) receive an identifier of a media playback system, (ii) link the identifier with a social-media account such that the media playback system is associated with the social-media account, (iii) based at least on linking the identifier with the social-media account, generate a social-media playback queue that is fillable with one or more media items that are playable by the media playback system, (iv) establish access permissions to the social-media playback queue, wherein the access permissions indicate at least one additional social-media account that (a) is within a social-media network of the social-media account and (b) has access to the social-media playback queue, (v) receive, from a computing device affiliated with the at least one additional social-media account, an indication of a media item to be added to the social-media playback queue, and (vi) add the media item to the social-media playback queue.

In an additional aspect, a method is provided. The method involves (i) transmitting, by a media playback device to a social-media computing system, an identifier of the media playback device to facilitate associating the media playback system with a first social-media account, (ii) receiving, by the media playback device from the social-media computing system, an indication of a social-media playback queue corresponding to a second social-media account, wherein the second social-media account is within a social-media network of the first social-media account, (iii) receiving, by a media playback device, a playback prompt instructing the media playback device to play back the social-media playback queue, and (iv) obtaining, by the media playback device, one or more media items in the social-media playback queue for play back by the media playback device.

In another aspect, a media playback device is provided. The media playback device comprises one or more media processing components, at least one processor, a non-transitory computer-readable medium and program instructions stored on the non-transitory computer-readable medium. The program instructions are executable by the at least one processor and when executed cause the media playback device to (i) transmit, to a social-media computing system, an identifier of the media playback system to facilitate associating the media playback system with a first social-media account, (ii) receive, from the social-media computing system, an indication of a social-media playback queue corresponding to a second social-media account, wherein the second social-media account is within a social-media network of the first social-media account, (iii) receive a playback prompt instructing the media playback device to play back the social-media playback queue, and (iv) obtain one or more media items in the social-media playback queue for play back by the media playback device.

In one other aspect, a non-transitory computer-readable medium is provided. The non-transitory computer-readable medium having instructions stored thereon that are executable by a media playback system to cause the media playback system to (i) transmit, to a social-media computing system, an identifier of the media playback system to facilitate associating the media playback system with a first social-media account, (ii) receive, from the social-media computing system, an indication of a social-media playback queue corresponding to a second social-media account, wherein the second social-media account is within a social-media network of the first social-media account, (iii) receive a playback prompt instructing the media playback device to play back the social-media playback queue, and (iv) obtain one or more media items in the social-media playback queue for play back by the media playback device.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. Tangible, non-transitory computer-readable media having stored thereon instructions that, when executed by one or more processors of a first computing device, cause the first computing device to perform functions comprising:
   receiving, via a network interface over a wide area network, an identifier of a media playback system that comprises at least one playback device located at premises associated with a first geographic location;
   associating the identifier of the media playback system with a first social-media account of a social-media network, wherein a social-media service defines existing connections between social-media accounts to form the social-media network;
   before a particular time on a particular date, receiving, via the network interface over the wide area network from a second computing device affiliated with the first social-media account, an indication of an upcoming social-media event corresponding to the first social-media account, the upcoming social-media event scheduled via the social-media network to start at the particular time on the particular date and occur at the premises associated with the first geographic location, wherein the indication of the upcoming social-media event comprises one or more second social-media accounts of the social-media network;
   based on the indication of the upcoming social-media event, generating a social-media playback queue;
   establishing access permissions to the social-media playback queue for the one or more second social-media accounts based on an indication that the one or more second social-media accounts received an invite to the upcoming social-media event;
   receiving, via the network interface over the wide area network from a third computing device affiliated with a given second social-media account of the one or more second social-media accounts, an indication of a media item from a given source, wherein the third computing device is located at a second geographic location different from the premises associated with the first geographic location at a first time that is before the particular time on the particular date;
   based on receiving the indication of the media item from the given source, causing the media item from the given source to be added to the social-media playback queue;
   receiving from the third computing device, an indication that the third computing device is at the first geographic location at a second time after the particular time on the particular date during the social-media event; and
   during the social-media event starting at the particular time on the particular date and based on receiving the indication that the third computing device is at the premises corresponding to the first geographic location, causing, via the wide area network, the media item to be streamed from the given source and played back via the at least one playback device of the media playback system at the first geographic location.

2. The tangible, non-transitory computer-readable media of claim 1, wherein the given media item is a first given media item and the given source is a first media service provider, and wherein the functions further comprise:
receiving, via the network interface over the wide area network, an indication of a second given media item from a second media service provider;
based on receiving the indication of the second given media item from the second media service provider, causing the second given media item from the second media service provider to be added to the social-media playback queue; and
during the social-media event, causing, via the wide area network, the second given media item to be streamed from the second media service provider and played back via the at least one playback device of the media playback system.

3. The tangible, non-transitory computer-readable media of claim 1, wherein the functions further comprise:
storing the social-media playback queue in memory storage of the first computing device.

4. The tangible, non-transitory computer-readable media of claim 1, wherein causing, via the wide area network, the given media item to be streamed from the given source and played back via the at least one playback device of the media playback system comprises:
retrieving the given media item from the given source; and
transmitting the retrieved given media item to the media playback system.

5. The tangible, non-transitory computer-readable media of claim 1, wherein causing, via the wide area network, the given media item to be streamed from the given source and played back via the at least one playback device of the media playback system comprises:
transmitting to the media playback system, a uniform resource locator corresponding to the given media item from the given source.

6. The tangible, non-transitory computer-readable media of claim 1, wherein the media playback system is a first media playback system, and wherein the functions further comprise:
during the social-media event, causing, via the wide area network, the given media item to be streamed from the given source and played back via a playback device of a second media playback system that is associated with the given second social-media account.

7. A method comprising:
receiving, via a network interface over a wide area network, an identifier of a media playback system that comprises at least one playback device located at premises associated with a first geographic location;
associating the identifier of the media playback system with a first social-media account of a social-media network, wherein a social-media service defines existing connections between social-media accounts to form the social-media network;
before a particular time on a particular date, receiving, via the network interface over the wide area network from a second computing device affiliated with the first social-media account, an indication of an upcoming social-media event corresponding to the first social-media account, the upcoming social-media event scheduled via the social-media network to start at the particular time on the particular date and occur at the premises associated with the first geographic location, wherein the indication of the upcoming social-media event comprises one or more second social-media accounts of the social-media network;
based on the indication of the upcoming social-media event, generating a social-media playback queue;
establishing access permissions to the social-media playback queue for the one or more second social-media accounts based on an indication that the one or more second social-media accounts received an invite to the upcoming social-media event;
receiving, via the network interface over the wide area network from a third computing device affiliated with a given second social-media account of the one or more second social-media accounts, an indication of a media item from a given source, wherein the third computing device is located at a second geographic location different from the premises associated with the first geographic location at a first time that is before the particular time on the particular date;
based on receiving the indication of the media item from the given source, causing the media item from the given source to be added to the social-media playback queue;
receiving from the third computing device, an indication that the third computing device is at the first geographic location at a second time after the particular time on the particular date during the social-media event; and
during the social-media event starting at the particular time on the particular date and based on receiving the indication that the third computing device is at the premises corresponding to the first geographic location, causing, via the wide area network, the media item to be streamed from the given source and played back via the at least one playback device of the media playback system at the first geographic location.

8. The method of claim 7, wherein the given media item is a first given media item and the given source is a first media service provider, and wherein the method further comprises:
receiving by the first computing device via the network interface over the wide area network, an indication of a second given media item from a second media service provider;
based on receiving the indication of the second given media item from the second media service provider, causing by the first computing device, the second given media item from the second media service provider to be added to the social-media playback queue; and
during the social-media event, causing by the first computing device via the wide area network, the second given media item to be streamed from the second media service provider and played back via the at least one playback device of the media playback system.

9. The method of claim 7, further comprising:
storing, by the first computing device, the social-media playback queue in memory storage of the first computing device.

10. The method of claim 7, wherein causing by the first computing device via the wide area network, the given media item to be streamed from the given source and played back via the at least one playback device of the media playback system comprises:

retrieving by the first computing device, the given media item from the given source; and transmitting by the first computing device, the retrieved given media item to the media playback system.

11. The method of claim 7, wherein causing by the first computing device via the wide area network, the given media item to be streamed from the given source and played back via the at least one playback device of the media playback system comprises:

transmitting by the first computing device to the media playback system, a uniform resource locator corresponding to the given media item from the given source.

12. The method of claim 7, wherein the media playback system is a first media playback system, and wherein the method further comprises:

during the social-media event, causing by the first computing device via the wide area network, the given media item to be streamed from the given source and played back via a playback device of a second media playback system that is associated with the given second social-media account.

13. Tangible, non-transitory computer-readable media having stored thereon instructions that, when executed by one or more processors of a playback device of a media playback system, cause the playback device to perform functions comprising:

transmitting to a social-media computing system via a network interface over a wide area network, an identifier of the media playback system to cause the media playback system to be associated with a first social-media account of a social-media network;

before a particular time on a particular date, receiving from the social-media computing system via the network interface over the wide area network, an indication of a social-media playback queue comprising audio tracks selected by a second social-media account of the social-media network for an upcoming social-media event scheduled via the social-media network to start at the particular time on the particular date and occur at premises associated with a first geographic location, wherein the social-media network defines an existing connection between the first social-media account and the second social-media account, and wherein the second social media account is associated with a second media playback system located at a second geographic location different from the premises associated with the first geographic location;

at or after the particular time on the particular date during the social-media event, receiving from the third computing device, an indication that a user associated with the second social-media account has checked-in via the social-media network to the social-media event at the premises associated with the first geographic location;

based on receiving the indication that the user associated with the second social-media account has checked in, causing one or more particular media items of the social-media playback queue to be added to a playback queue of the media playback system;

after adding the one or more particular media items of the social-media playback queue to the playback queue of the media playback system, receiving an input comprising (i) access permissions indicating that the second social media account is associated with an invite to the social-media event and (ii) a command to play the one or more particular media items; and responsive to receiving the input and receiving the indication that the user or the device associated with the second social-media account is at the first location, playing the one or more particular media items in the playback queue of the media playback system at premises associated with the first geographic location.

14. The tangible, non-transitory computer-readable media of claim 13, wherein the identifier comprises a household identifier that is unique to the media playback system.

15. The tangible, non-transitory computer-readable media of claim 13, wherein causing one or more particular media items of the social-media playback queue to be added to a playback queue of the media playback system comprises:

transmitting to the media playback system, an indication of the social-media playback queue.

16. The tangible, non-transitory computer-readable media of claim 13, wherein the functions further comprise:

prior to transmitting to the social-media computing system, the identifier of the media playback system, receiving data indicating (i) the first social-media account and (ii) credentials associated with accessing the first social-media account.

17. The tangible, non-transitory computer-readable media of claim 13, wherein the functions further comprise:

after the social-media event, generating a playlist based on the social-media playback queue; and storing the generated playlist in memory storage associated with the media playback system.

18. The tangible, non-transitory computer-readable media of claim 13, wherein the indication of a social-media playback queue comprises an indication of the first geographic location of the social-media event, and wherein the input comprising (i) access permissions indicating that the second social media account is associated with the invite to the social-media event and (ii) the command to play the one or more particular media items further comprises an indication that a computing device corresponding to the second social media account is at the premises associated with the first geographic location of the social-media event.

19. The tangible, non-transitory computer-readable media of claim 1, wherein the premises associated with the first geographic location comprise a home or business and wherein the first geographic location is represented by global positioning system coordinates.

20. The method of claim 7, wherein the premises associated with the first geographic location comprise a home or business and wherein the first geographic location is represented by global positioning system coordinates n.

* * * * *